US012651412B2

(12) United States Patent
Moffett

(10) Patent No.: US 12,651,412 B2
(45) Date of Patent: Jun. 9, 2026

(54) OPTIMIZING IMAGE CAPTURE FOR TRAINING MACHINE-LEARNED MODELS FOR IMPLICIT REPRESENTATION

(71) Applicant: Google LLC, Mountain View, CA (US)

(72) Inventor: Cardin Everett Moffett, Denver, CO (US)

(73) Assignee: GOOGLE LLC, Mountain View, CA (US)

( * ) Notice: Subject to any disclaimer, the term of this patent is extended or adjusted under 35 U.S.C. 154(b) by 292 days.

(21) Appl. No.: 18/392,908

(22) Filed: Dec. 21, 2023

(65) Prior Publication Data

US 2025/0209745 A1     Jun. 26, 2025

(51) Int. Cl.

| | |
|---|---|
| *G06T 19/00* | (2011.01) |
| *G06T 7/00* | (2017.01) |
| *G06T 7/80* | (2017.01) |
| *G06T 15/06* | (2011.01) |
| *G06T 15/55* | (2011.01) |
| *H04N 23/60* | (2023.01) |

(52) U.S. Cl.
CPC .......... *G06T 19/003* (2013.01); *G06T 7/0002* (2013.01); *G06T 7/80* (2017.01); *G06T 15/06* (2013.01); *G06T 15/55* (2013.01); *H04N 23/64* (2023.01); *G06T 2200/08* (2013.01); *G06T 2207/10016* (2013.01); *G06T 2207/20081* (2013.01); *G06T 2207/20084* (2013.01); *G06T 2207/30168* (2013.01); *G06T 2210/04* (2013.01)

(58) Field of Classification Search
CPC ....... G06T 19/003; G06T 7/0002; G06T 7/80; G06T 15/06; G06T 15/55; G06T 2200/08; G06T 2207/10016; G06T 2207/20081; G06T 2207/20084; G06T 2207/30168; G06T 2210/04; G06T 17/00; G06T 5/80; G06T 11/00; G06T 15/02; H04N 23/64; G06N 3/0499; G06N 20/00
USPC ......................................................... 345/426
See application file for complete search history.

(56) References Cited

U.S. PATENT DOCUMENTS

| | | | | |
|---|---|---|---|---|
| 11,043,038 B1 * | 6/2021 | Ngai | ....................... | G06T 7/246 |
| 11,765,323 B2 * | 9/2023 | Steffanson | ........... | G06V 10/147 |
| | | | | 250/334 |
| 2017/0069130 A1 * | 3/2017 | Yoo | ......................... | G06F 16/29 |
| 2023/0184558 A1 * | 6/2023 | Waychal | ........... | G01C 21/3647 |
| | | | | 701/426 |
| 2023/0400327 A1 * | 12/2023 | Streem | ..................... | G06T 7/74 |

(Continued)

*Primary Examiner* — Sheree N Brown

(74) *Attorney, Agent, or Firm* — DORITY & MANNING P.A.

(57) ABSTRACT

Capture information is caused to be sent to a user computing device, wherein the capture information comprises instructions to a user of the user computing device to capture a plurality of image sets for a Point of Interest (POI). The plurality of image sets for the POI are received, wherein the plurality of image sets comprises a calibration image set, a POI depiction image set, and a path image set. A machine-learned POI representation model is trained with the plurality of image sets for the POI, wherein the machine-learned POI representation model is trained to generate a representation of the POI. The machine-learned POI representation model is used to generate video data that depicts a virtual camera traversing a path from a starting location to an ending location within the POI.

20 Claims, 10 Drawing Sheets

(56)　　　　　　References Cited

U.S. PATENT DOCUMENTS

2025/0190761 A1 *　6/2025　Filip ........................ G06N 3/08
2025/0198790 A1 *　6/2025　Tran ....................... G06N 20/00

* cited by examiner

Figure 6:
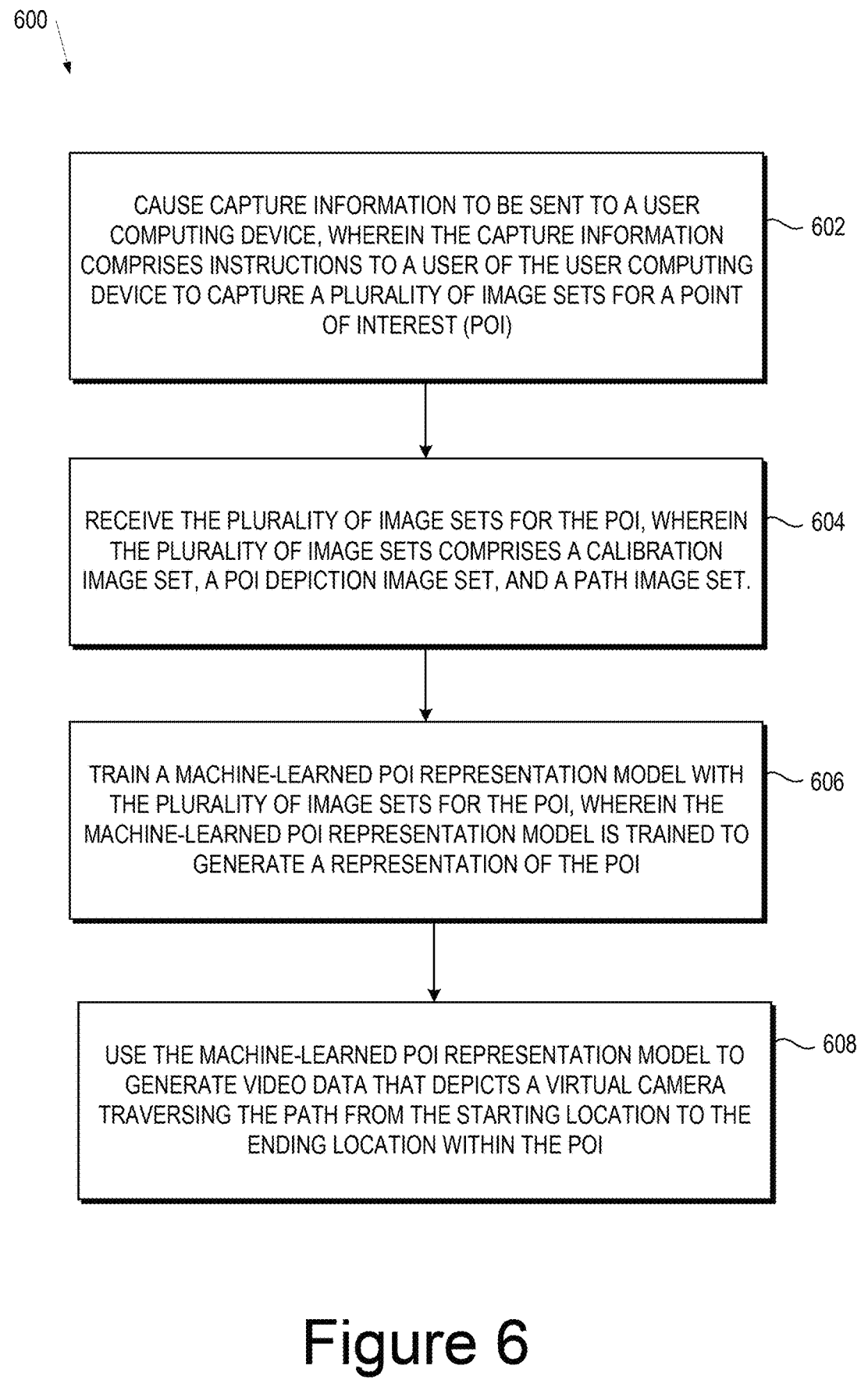

600

CAUSE CAPTURE INFORMATION TO BE SENT TO A USER COMPUTING DEVICE, WHEREIN THE CAPTURE INFORMATION COMPRISES INSTRUCTIONS TO A USER OF THE USER COMPUTING DEVICE TO CAPTURE A PLURALITY OF IMAGE SETS FOR A POINT OF INTEREST (POI) ⟋ 602

RECEIVE THE PLURALITY OF IMAGE SETS FOR THE POI, WHEREIN THE PLURALITY OF IMAGE SETS COMPRISES A CALIBRATION IMAGE SET, A POI DEPICTION IMAGE SET, AND A PATH IMAGE SET. ⟋ 604

TRAIN A MACHINE-LEARNED POI REPRESENTATION MODEL WITH THE PLURALITY OF IMAGE SETS FOR THE POI, WHEREIN THE MACHINE-LEARNED POI REPRESENTATION MODEL IS TRAINED TO GENERATE A REPRESENTATION OF THE POI ⟋ 606

USE THE MACHINE-LEARNED POI REPRESENTATION MODEL TO GENERATE VIDEO DATA THAT DEPICTS A VIRTUAL CAMERA TRAVERSING THE PATH FROM THE STARTING LOCATION TO THE ENDING LOCATION WITHIN THE POI ⟋ 608

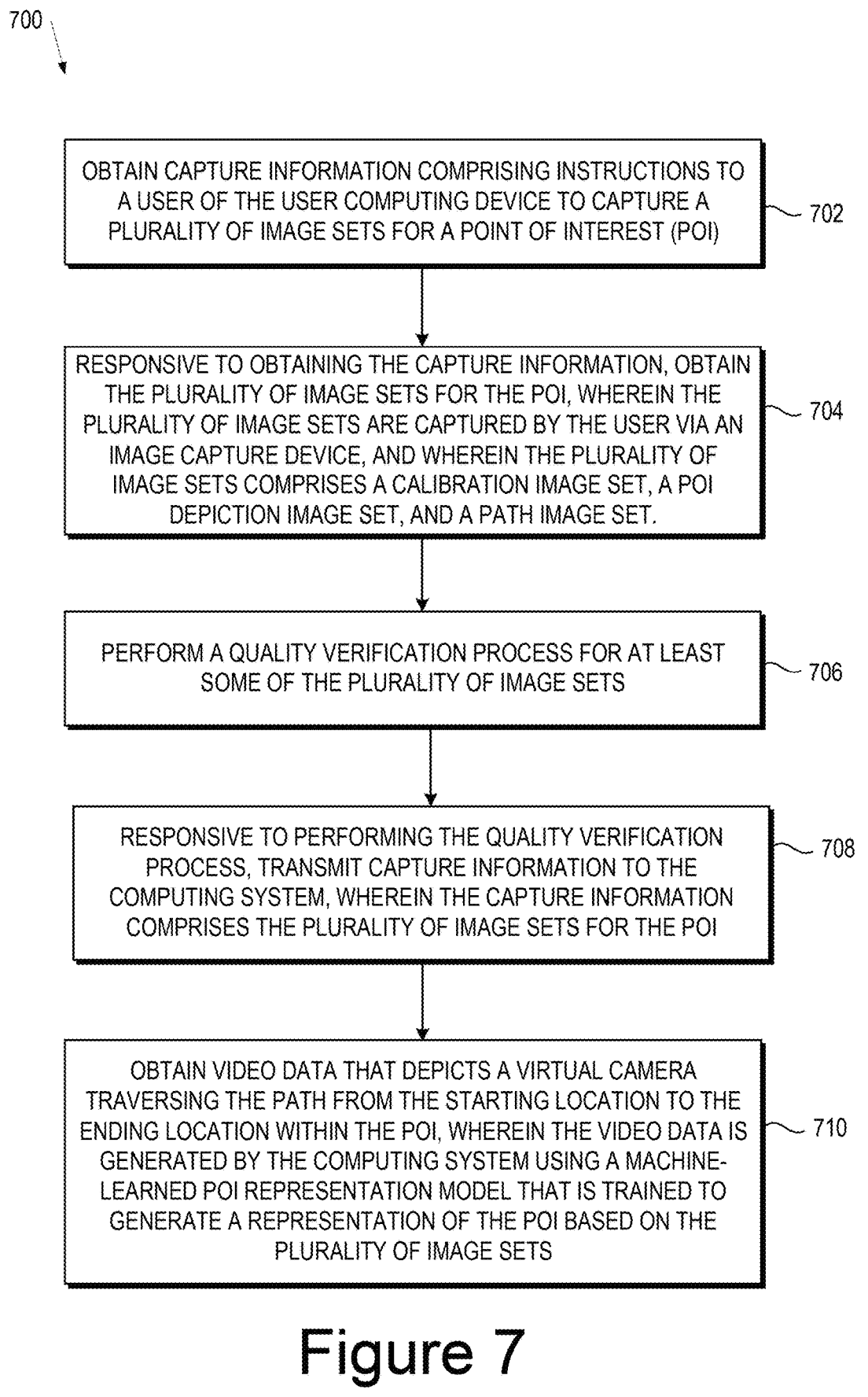

OBTAIN CAPTURE INFORMATION COMPRISING INSTRUCTIONS TO A USER OF THE USER COMPUTING DEVICE TO CAPTURE A PLURALITY OF IMAGE SETS FOR A POINT OF INTEREST (POI) ⟋ 702

RESPONSIVE TO OBTAINING THE CAPTURE INFORMATION, OBTAIN THE PLURALITY OF IMAGE SETS FOR THE POI, WHEREIN THE PLURALITY OF IMAGE SETS ARE CAPTURED BY THE USER VIA AN IMAGE CAPTURE DEVICE, AND WHEREIN THE PLURALITY OF IMAGE SETS COMPRISES A CALIBRATION IMAGE SET, A POI DEPICTION IMAGE SET, AND A PATH IMAGE SET. ⟋ 704

PERFORM A QUALITY VERIFICATION PROCESS FOR AT LEAST SOME OF THE PLURALITY OF IMAGE SETS ⟋ 706

RESPONSIVE TO PERFORMING THE QUALITY VERIFICATION PROCESS, TRANSMIT CAPTURE INFORMATION TO THE COMPUTING SYSTEM, WHEREIN THE CAPTURE INFORMATION COMPRISES THE PLURALITY OF IMAGE SETS FOR THE POI ⟋ 708

OBTAIN VIDEO DATA THAT DEPICTS A VIRTUAL CAMERA TRAVERSING THE PATH FROM THE STARTING LOCATION TO THE ENDING LOCATION WITHIN THE POI, WHEREIN THE VIDEO DATA IS GENERATED BY THE COMPUTING SYSTEM USING A MACHINE-LEARNED POI REPRESENTATION MODEL THAT IS TRAINED TO GENERATE A REPRESENTATION OF THE POI BASED ON THE PLURALITY OF IMAGE SETS ⟋ 710

Figure 7

OPTIMIZING IMAGE CAPTURE FOR TRAINING MACHINE-LEARNED MODELS FOR IMPLICIT REPRESENTATION

FIELD

The present disclosure relates generally to collection and utilization of training data for machine-learned models. More specifically, the present disclosure relates to optimizing image capture for training models to implicitly represent three-dimensional spaces.

BACKGROUND

Recently, machine-learned models have been increasingly leveraged for a variety of generative tasks. In particular, models such as Neural Radiance Field (NeRF) models have been introduced for implicitly representing three-dimensional spaces based on two-dimensional images depicting the space. For example, once trained on images that depict a particular three-dimensional space, a NeRF model can generate radiance information for a particular point in the three-dimensional space given spatial coordinates corresponding to the point. In this manner, the NeRF model can be leveraged to render images depicting a novel view of the three-dimensional space.

Implicit representation models, such as NeRF models, enable rendering of novel views of three-dimensional spaces much more efficiently than conventional techniques, which usually require texture artists, animators, modelers, etc. However, conventional implicit representation models generally must be trained with very precisely captured images, and capturing such images is generally outside the skill set of the average user. In turn, this bar has prevented the benefits of implicit representation models from being utilized by the average user.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes causing, by a computing system comprising one or more computing devices, capture information to be sent to a user computing device, wherein the capture information comprises instructions to a user of the user computing device to capture a plurality of image sets for a Point of Interest (POI). The method includes receiving, by the computing system from the user computing device, the plurality of image sets for the POI, wherein the plurality of image sets comprises a calibration image set comprising a plurality of calibration image pairs, each of the calibration image pairs comprising two calibration images captured at two different locations within the POI that are separated by a pre-defined distance, a POI depiction image set comprising a plurality of depiction images that depict the POI from a respective plurality of angles and/or positions, and a path image set comprising a plurality of path images that collectively depict a path from a starting location to an ending location within the POI. The method includes training, by the computing system, a machine-learned POI representation model with the plurality of image sets for the POI, wherein the machine-learned POI representation model is trained to generate a representation of the POI. The method includes using, by the computing system, the machine-learned POI representation model to generate video data that depicts a virtual camera traversing the path from the starting location to the ending location within the POI.

Another example aspect of the present disclosure is directed to a user computing device. The user computing device includes one or more processor devices. The user computing device includes one or more tangible, non-transitory computer readable media storing computer-readable instructions that when executed by the one or more processor devices cause the one or more processor devices to perform operations. The operations include obtaining, from a computing system, capture information comprising instructions to a user of the user computing device to capture a plurality of image sets for a POI. The operations include, responsive to obtaining the capture information, obtaining the plurality of image sets for the POI, wherein the plurality of image sets are captured by the user via an image capture device, and wherein the plurality of image sets comprises a calibration image set comprising a plurality of calibration image pairs, each of the calibration image pairs comprising two calibration images captured at two different locations within the POI that are separated by a pre-defined distance, a POI depiction image set comprising a plurality of depiction images that depict the POI from a respective plurality of angles and/or positions, and a path image set comprising a plurality of path images that collectively depict a path from a starting location to an ending location within the POI. The operations include performing a quality verification process for at least some of the plurality of image sets. The operations include, responsive to performing the quality verification process, transmitting capture information to the computing system, wherein the capture information comprises the plurality of image sets for the POI. The operations include obtaining, from the computing system, video data that depicts a virtual camera traversing the path from the starting location to the ending location within the POI, wherein the video data is generated by the computing system using a machine-learned POI representation model that is trained to generate a representation of the POI based on the plurality of image sets.

Another example aspect of the present disclosure is directed to one or more tangible, non-transitory computer readable media storing computer-readable instructions that when executed by one or more processor devices cause the one or more processor devices to perform operations. The operations include causing capture information to be sent to a user computing device, wherein the capture information comprises instructions to a user of the user computing device to capture a plurality of image sets for a POI. The operations include receiving, from the user computing device, the plurality of image sets for the POI, wherein the plurality of image sets comprises a calibration image set comprising a plurality of calibration image pairs, each of the calibration image pairs comprising two calibration images captured at two different locations within the POI that are separated by a pre-defined distance, a POI depiction image set comprising a plurality of depiction images that depict the POI from a respective plurality of angles and/or positions, and a path image set comprising a plurality of path images that collectively depict a path from a starting location to an ending location within the POI. The operations include training a machine-learned POI representation model with the plurality of image sets for the POI, wherein the machine-learned POI representation model is trained to generate a representation of the POI. The operations include using the machine-learned POI representation model to generate video data that depicts a virtual camera traversing the path from the starting location to the ending location within the POI.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts a flow chart diagram of an example method for optimizing image capture for training machine-learned POI representation models according to some implementations of the present disclosure.

FIG. 7 depicts a flow chart diagram of an example method for local optimization of image capture for training machine-learned POI representation models according to some implementations of the present disclosure.

Figure 1:
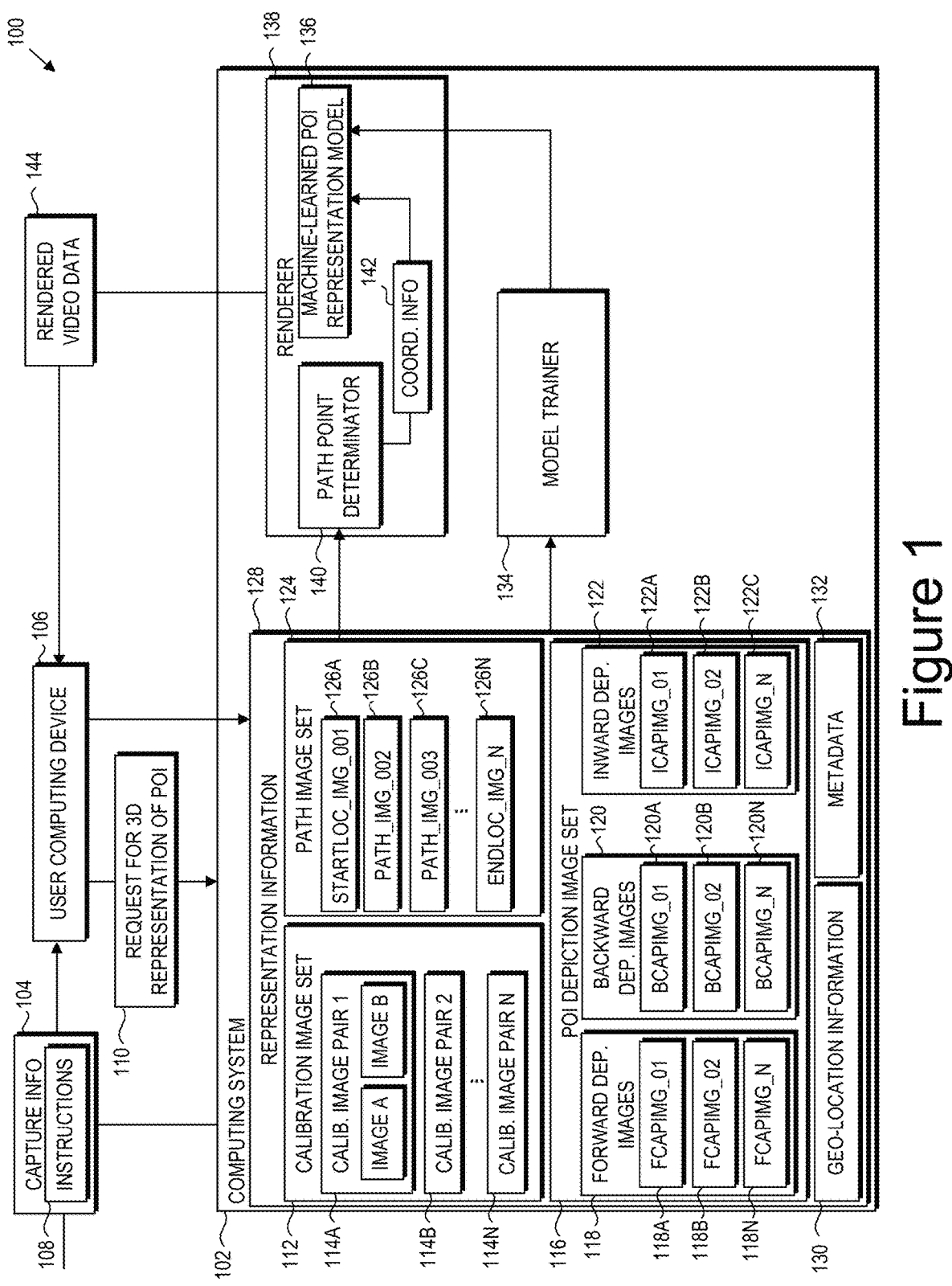
FIG. 1 is an overview dataflow diagram for optimizing image capture to train machine-learned models for implicit representation according to some implementations of the present disclosure.

Reference numerals that are repeated across plural figures are intended to identify the same features in various implementations.

DETAILED DESCRIPTION

Generally, the present disclosure relates to collection and utilization of training data for machine-learned models. More specifically, the present disclosure relates to optimizing image capture for training models to implicitly represent three-dimensional spaces. Implicit representation models enable rendering of novel views of three-dimensional spaces much more efficiently than conventional techniques, which usually require texture artists, animators, modelers, etc. However, conventional implicit representation models generally must be trained with very precisely captured images, and capturing such images is generally outside the skill set of the average user. In turn, this bar has prevented the benefits of implicit representation models from being utilized by the average user.

Accordingly, implementations of the present disclosure propose optimizing image capture for training machine-learned implicit representation models. More specifically, a computing system (e.g., a server system, a cloud system, etc.) can receive a request to generate a video rendering of a particular Point of Interest (POI) from a user computing device. In response, the computing system can provide capture instructions to the user computing device. The capture instructions can instruct a user how to capture a number of image sets for generating an implicit representation of the POI.

The image sets can include a calibration image set, a POI depiction image set, and a path image set. The instructions for capturing the calibration image set can instruct the user to capture pairs of images at locations separated by a pre-defined distance. For example, the instructions for the calibration image set may instruct a user to capture an image from a first location within the POI (e.g., a location within a room) while viewing a second location within the POI that is located a pre-defined distance from the first location (e.g., six feet). The instructions may then instruct the user to capture a second image from the second location while viewing the first location. In this manner, the calibration image set can provide a frame of reference for the spatial dimensions of the POI.

The instructions for capturing the POI depiction image set can instruct the user to capture a number of depiction images that depict the POI from a variety of different angles and positions. For example, if the POI is a room, the instructions can instruct the user to collect a first set of images while walking around the periphery of the room in a forward direction. The instructions can further instruct the user to collect a second set of images while walking around the periphery of the room in a backwards direction. The instructions can further instruct the user to collect a third set of images while walking around the periphery of the room in an inwards direction (i.e., towards the center of the room). In this manner, the instructions provided to the user can ensure that the POI depiction image set depicts most, or all, surfaces of the POI.

For the path image set, the instructions for capturing the path image set can instruct the user to sequentially capture a series of images while following a path the user wishes to depict. For example, if the user wishes to depict a straight path from a first point to a second point within the POI, the user can move along the path while sequentially capturing images (e.g., every three feet, etc.). For another example, the user may depict a looping path by navigating around the periphery of a room in a clockwise or counter-clockwise fashion. In this manner, the path image set can be utilized to derive the path for a virtual camera within the three-dimensional representation of the POI.

The computing system can train a machine-learned representation model to represent the POI based on the plurality of image sets. In particular, the machine-learned representation model can be trained to generate a three-dimensional representation of the POI. For example, assume that the machine-learned representation model is a Neural Radiance Field (NeRF) model. The computing system can first utilize the calibration image set to determine spatial dimensions of the POI. The computing system can then pose the POI depiction images in space and train the NeRF model to generate novel views of a three-dimensional representation of the POI given a certain perspective.

Once trained, the computing system can use the machine-learned representation model to generate video data that depicts a virtual camera traveling a path indicated by the path image set. For example, the path image set can include a plurality of images captured sequentially while a user traverses a particular path through the POI from a starting location to an ending location. The computing system can generate a virtual path for a virtual camera that corresponds to the path indicated by the path image set. The computing system can then render video data that depicts the POI from the perspective of the virtual camera while the virtual camera traverses the path. In this manner, implementations described herein can enable users without specialized skillsets to efficiently generate virtual tours and similar representations of POIs (e.g., venues, businesses, recreation areas, etc.).

Aspects of the present disclosure provide a number of technical effects and benefits. As one example technical effect and benefit, implementations described herein can substantially reduce the expenditure of computing resources associated with exchanging and utilizing large sets of images for training machine-learned representation models. More specifically, by providing instructions to capture specific types of image sets, implementations described herein can substantially reduce the total number of images required to train machine-learned representation models. In turn, the reduced number of training images requires the expenditure of fewer bandwidth resources for transmitting images to a training system and computing resources for training the machine-learned representation models (e.g., power, memory, compute cycles, storage, network resources, etc.).

With reference now to the Figures, example implementations of the present disclosure will be discussed in further detail.

FIG. 1 is an overview dataflow diagram for optimizing image capture to train machine-learned models for implicit representation according to some implementations of the present disclosure. More specifically, a computing system 102 can cause capture information 104 to be provided to a user computing device 106. The computing system 102 can be, or include, any number of physical and/or virtualized hardware resource(s). For example, the computing system 102 can be a distributed cloud computing system that includes both physical and virtualized hardware resources located in multiple physical locations. For another example, the computing system 102 can be a server computing system that includes one or more processor device(s). The user computing device 106 can be any type or manner of computing device that a user can utilize to capture and/or transmit images (e.g., a smartphone, laptop, desktop computer, tablet, wearable device, Digital Single-Lens Reflex (DSLR) camera, etc.). For example, the computing system 102 can be a system associated with one or more application-based service(s) (e.g., a mapping service, a visual search service, etc.).

As described above, the computing system 102 can cause the capture information 104 to be sent to the user computing device 106. In some implementations, the computing system 102 can directly transmit the capture information 104 to the user computing device 106. Alternatively, in some implementations, the computing system 102 can instruct another computing device or system to provide the capture information 104 to the user computing device 106 (e.g., a network node, Content Delivery Network (CDN), networked computing device, etc.). Alternatively, in some implementations, the computing system 102 can instruct the user computing device 106 to retrieve the capture information 104 from the other computing device or system.

The capture information 104 can include instructions 108 for a user of the user computing device 106. The instructions 108 can instruct the user to capture a number of different image sets for a particular POI (e.g., a room, a building, an outdoor space, a business, etc.). It should be noted that, as described herein, a "POI" can generally refer to any type or manner of room(s), building(s), outdoor area(s), geographic region(s), or any combination thereof. For example, a POI may refer to an open, enclosed, or semi-enclosed outdoor space, such as an amphitheater, playground, outdoor seating area, rooftop, hiking trail, etc. For another example, the POI may refer to one or more buildings, and/or one or more rooms within the building(s).

Generally, the user of the user computing device 106 can be associated with the POI. For example, if the POI is a restaurant, the user may be an employee or owner of the restaurant, a contractor hired by the restaurant, etc. For another example, if the POI is a recreation area provided by a government organization, the user may be a member of the governmental organization. For another example, if the POI is a public space, or a publicly accessible space, the user may be a member of the public. For yet another example, the user may be associated with the one or more application-based service(s) described above (e.g., an employee or contractor for the service(s), etc.).

In some implementations, the computing system 102 can cause transmission of the capture information 104 to the user computing device 106 in response to a request 110 from the user computing device 106. Specifically, the user computing device 106 can provide the request 110 for three-dimensional representation of a particular POI. In response, the computing system 102 can cause the capture information 104 with the instructions 108 to be sent to the user computing device 106 for training a model to generate the three-dimensional representation of the POI.

In some implementations, the instructions 108 in the capture information 104 can instruct the user of the user computing device 106 to capture a calibration image set 112. The calibration image set 112 can include a plurality of calibration image pairs 114A-114N (generally, calibration image pairs 114). Each of the calibration image pairs 114 can include two images captured at two respective locations within the POI separated by a pre-defined distance.

Figure 2:
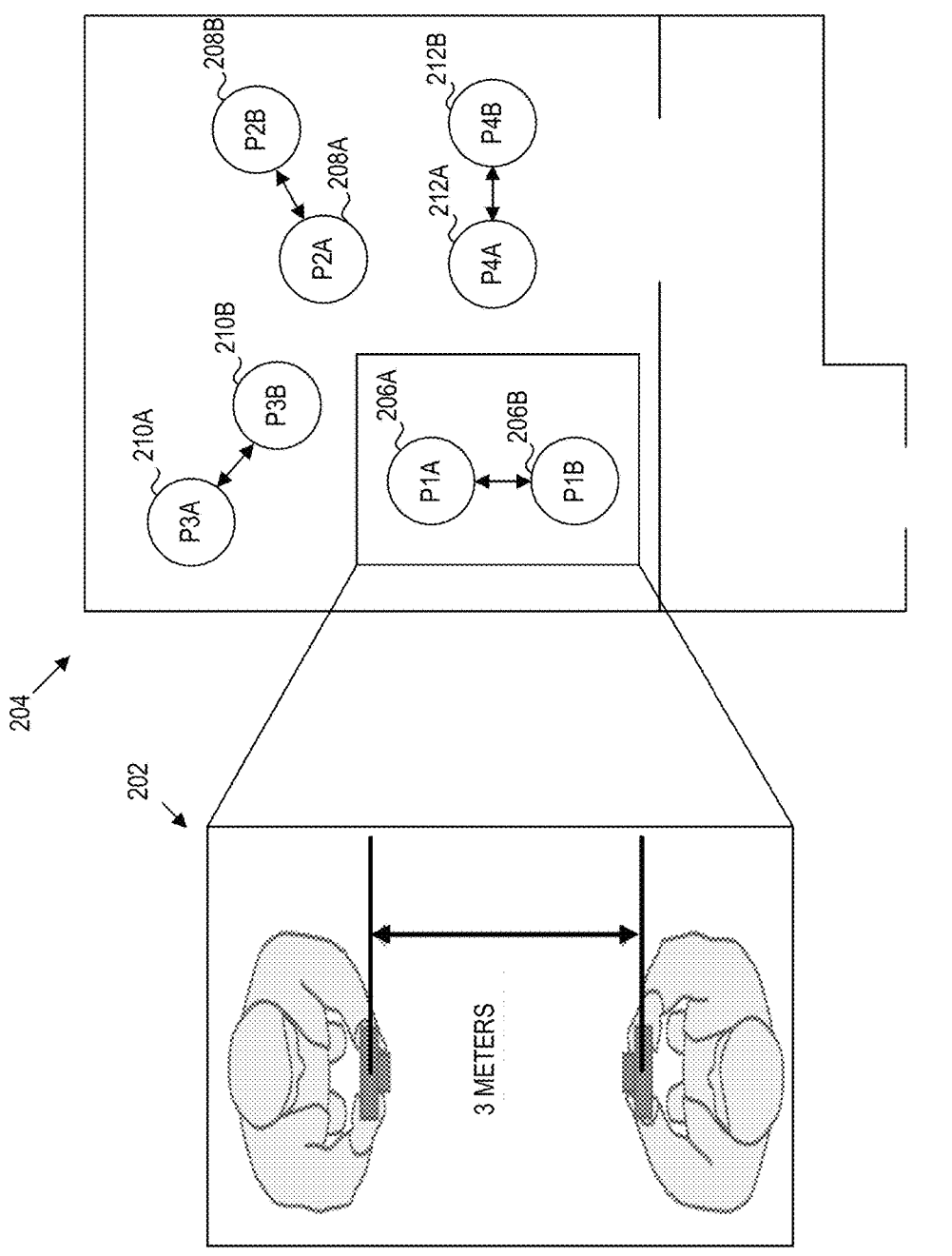
FIG. 2 depicts example capture instructions for capturing a calibration image set according to some implementations of the present disclosure.

For example, turning to FIG. 2, FIG. 2 depicts example capture instructions for capturing a calibration image set according to some implementations of the present disclosure. FIG. 2 will be discussed in conjunction with FIG. 1. In particular, calibration capture instructions 202 is an example instruction image that can be included in the instructions 108. To follow the depicted example, the calibration capture instructions 202 indicates to the user of the user computing device 106 to capture the calibration image pairs at chest height from a pre-defined distance of three meters while facing the paired location. Based on the calibration capture instructions 202, the user can capture a plurality of calibration image pairs where each image pair includes two images captured at two respective locations separated by three meters.

To follow the illustrated example, POI 204 is a room in a building that the user of the user of the user computing device 106 wishes to represent in three dimensions. Based on the calibration capture instructions 202, the user can first capture image A of the calibration image pair 114A at a location 206A within the POI 204. The user can capture image B of the calibration image pair 114A at a location 206B within the POI that is separated from the location 206A by three meters. When capturing image A of the calibration image pair 114A, the user can face towards the location 206B, and when capturing image B of the calibration image pair 114A, the user can face towards the location 206A. The user can repeat this process to capture calibration image pair 114B at locations 208A and 208B, calibration image pair 114C at locations 210A and 210B, calibration image pair 114N at locations 212A and 212B, etc. In this manner, the instructions 108 can enable the user of the user computing device 106 to capture a calibration image set 112 sufficient for training a model for three-dimensional representation of the POI 204.

Returning to FIG. 1, in some implementations, the instructions 108 in the capture information 104 can instruct the user of the user computing device 106 to capture a POI depiction image set 116. The POI depiction image set 116 can include a plurality of POI depiction images. Each of the POI depiction images can depict the POI, or some portion of the POI, from a different angle and/or position.

In some implementations, the POI depiction image set 116 can include a plurality of forward-facing depiction images 118A-118N (generally, forward-facing depiction images 118). The forward-facing depiction images 118 can be captured while the user traverses the POI in a forward direction, and each of the forward-facing depiction images 118 can depict the POI from a viewpoint that faces the forward direction.

Additionally, or alternatively, in some implementations, the POI depiction image set 116 can include a plurality of backward-facing depiction images 120A-120N (generally, backward-facing depiction images 120). The backward-facing depiction images 120 can be captured while the user traverses the POI in a backward direction opposite the forward direction, and each of the backward-facing depiction images 120 can depict the POI from a viewpoint that faces the backward direction.

Additionally, or alternatively, in some implementations, the POI depiction image set 116 can include a plurality of inward-facing depiction images 122A-122N (generally, inward-facing depiction images 122). The inward-facing depiction images 122 can be captured while the user traverses the POI, and each of the inward-facing depiction images 122 can depict the POI from a viewpoint that faces perpendicular to the forward direction and the backward direction.

For example, assume that the POI is an empty rectangular room. To capture the forward-facing depiction images 118, the user can traverse clockwise in a forward direction around the outer periphery of the rectangular room while capturing the forward-facing depiction images 118. To capture the backward-facing depiction images 120, the user can traverse counter-clockwise in a backward direction around the outer periphery of the rectangular room while capturing the backward-facing depiction images 120. To capture the inward-facing depiction images 122, the user can traverse clockwise in a forward direction or counter-clockwise in a backward direction around the outer periphery of the rectangular room while capturing images.

Figure 3A:
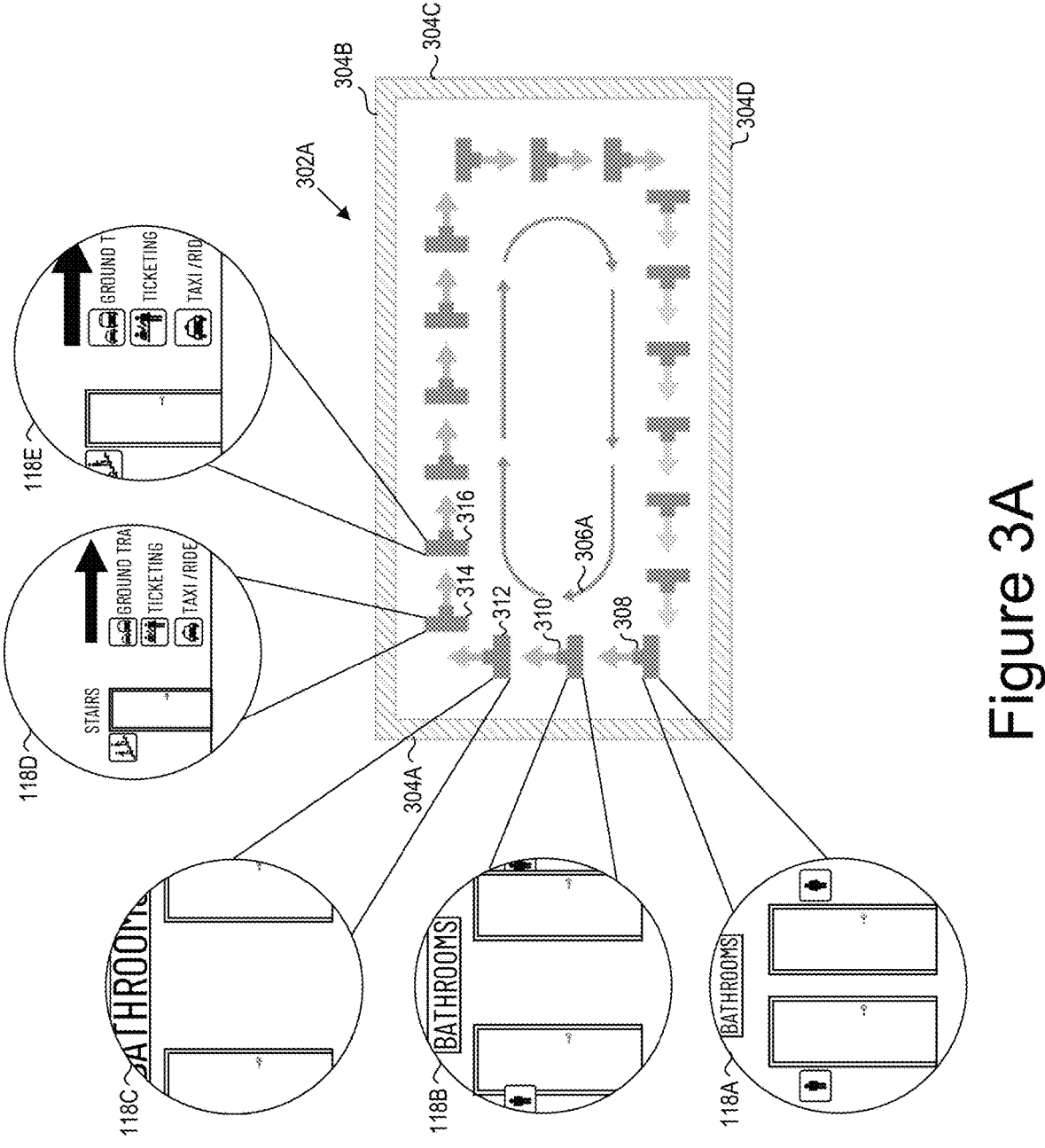
FIG. 3A depicts example capture instructions for capturing forward-facing depiction images for a Point of Interest (POI) depiction image set according to some implementations of the present disclosure.

For a more specific example, turning to FIG. 3A, FIG. 3A depicts example capture instructions for capturing forward-facing depiction images for a POI depiction image set according to some implementations of the present disclosure. FIG. 3A will be discussed in conjunction with FIG. 1. To follow the illustrated example, forward-facing capture instructions 302A illustrate an example POI 303 (e.g., an area of an airport) formed by surfaces 304A-304D (generally, surfaces 304). The forward-facing capture instructions 302A further illustrate a movement indicator 306A. The movement indicator 306A indicates a forward direction that the user is to move, or traverse, while capturing the forward-facing depiction images 118. As illustrated, the forward-facing capture instructions 302A indicate to the user to traverse in a clockwise direction around the periphery of the POI 303 while capturing images from a viewpoint that faces the forward direction. In other words, the forward-facing capture instructions 302A instruct the user to begin moving clockwise around the outer edge of the room while capturing images in the same direction as they are moving.

The forward-facing capture instructions 302A depict a number of user capture representations 308-316. The user capture representations 308-316 correspond to specific positions, or locations, within the POI 303 at which the forward-facing depiction images 118 are captured. After capturing one of the forward-facing depiction images 118, the user can move from the location of one user capture representation to the location of a successive user capture representation. The direction of this movement is indicated by the movement indicator 306A. Each of the user capture representations 308-316 includes an arrow that indicates a direction the user is facing when a corresponding forward-facing depiction image 118 is captured. A subset of the forward-facing depiction images 118 are depicted in FIG. 3A to illustrate differences between the forward-facing depiction images 118 as the user moves in a forward direction. However, it should be noted that forward-facing depiction images 118 can depict any type or manner of POI from any viewpoint or perspective.

For example, the forward-facing capture instructions 302A depict a user capture representation 308. The user capture representation 308 indicates a position at which the forward-facing depiction image 118A is captured. The user capture representation 308 also indicates the direction the user is facing when the forward-facing depiction image 118A is captured. To follow the previous example of an airport, the surface 304B of the POI 303 can be a wall that includes entrances to bathrooms for men and women within the airport. When located at the position of the user capture representation 308, the user can capture the forward-facing depiction image 118A while facing the surface 304B.

The forward-facing capture instructions 302A depict a user capture representation 310. The user capture representation 310 indicates a position at which the forward-facing depiction image 118B is captured. The user capture representation 310 also indicates the direction the user is facing when the forward-facing depiction image 118B is captured. Because the user is still facing and moving in the same direction as when the forward-facing depiction image 118A was captured, the forward-facing depiction image 118B can depict the same portion of the surface 304B as the forward-facing depiction image 118A. However, because the user has moved closer to the surface 304B since the forward-facing depiction image 118A was captured, the viewpoint from which the forward-facing depiction image 118B depicts the surface 304B has also moved closer to the surface 304B. Similarly, user capture representation 312 indicates that the user has moved closer to the surface 304B after capturing the forward-facing depiction image 118B, forward-facing depiction image 118C can depict the surface 304B from a viewpoint that is closer to the surface 304B than that of the forward-facing depiction image 118B.

The forward-facing capture instructions 302A depict a user capture representation 314. Like the user capture representations 308-312, the user capture representation 314 can indicate a position of the user, a direction the user is facing, and a direction the user is moving. Further, like the user capture representations 308-312, the user capture representation 314 faces the same direction as indicated by the movement indicator 306A for the position of the user capture representation 314. However, unlike the user capture representations 308-312, the user capture representation 314 faces the surface 304C of the POI 303 rather than the surface 304B. In some implementations, this can be due to the user reaching a threshold distance from the surface 304B at which point further movement towards the surface 304B is unnecessary.

The forward-facing capture instructions 302A depict a user capture representation 316. The user capture representation 316 indicates a position at which the forward-facing depiction image 118E is captured. The user capture representation 316 also indicates the direction the user is facing when the forward-facing depiction image 118E is captured. Because the user is still facing and moving in the same direction as when the forward-facing depiction image 118D was captured, the forward-facing depiction image 118D can depict the same portion of the surface 304C as the forward-facing depiction image 118D. However, because the user has moved closer to the surface 304C since the forward-facing depiction image 118D was captured, the viewpoint from which the forward-facing depiction image 118E depicts the surface 304C has also moved closer to the surface 304C.

In such fashion, the forward-facing capture instructions 302A can instruct a user to capture each of the surfaces 304A-304D from a variety of locations and viewpoints while traversing the POI 303 in the direction indicated by the movement indicator 306A, thus ensuring that the forward-facing depiction images 118 are sufficient to train a model for generate a three-dimensional representation of the POI.

Figure 3B:
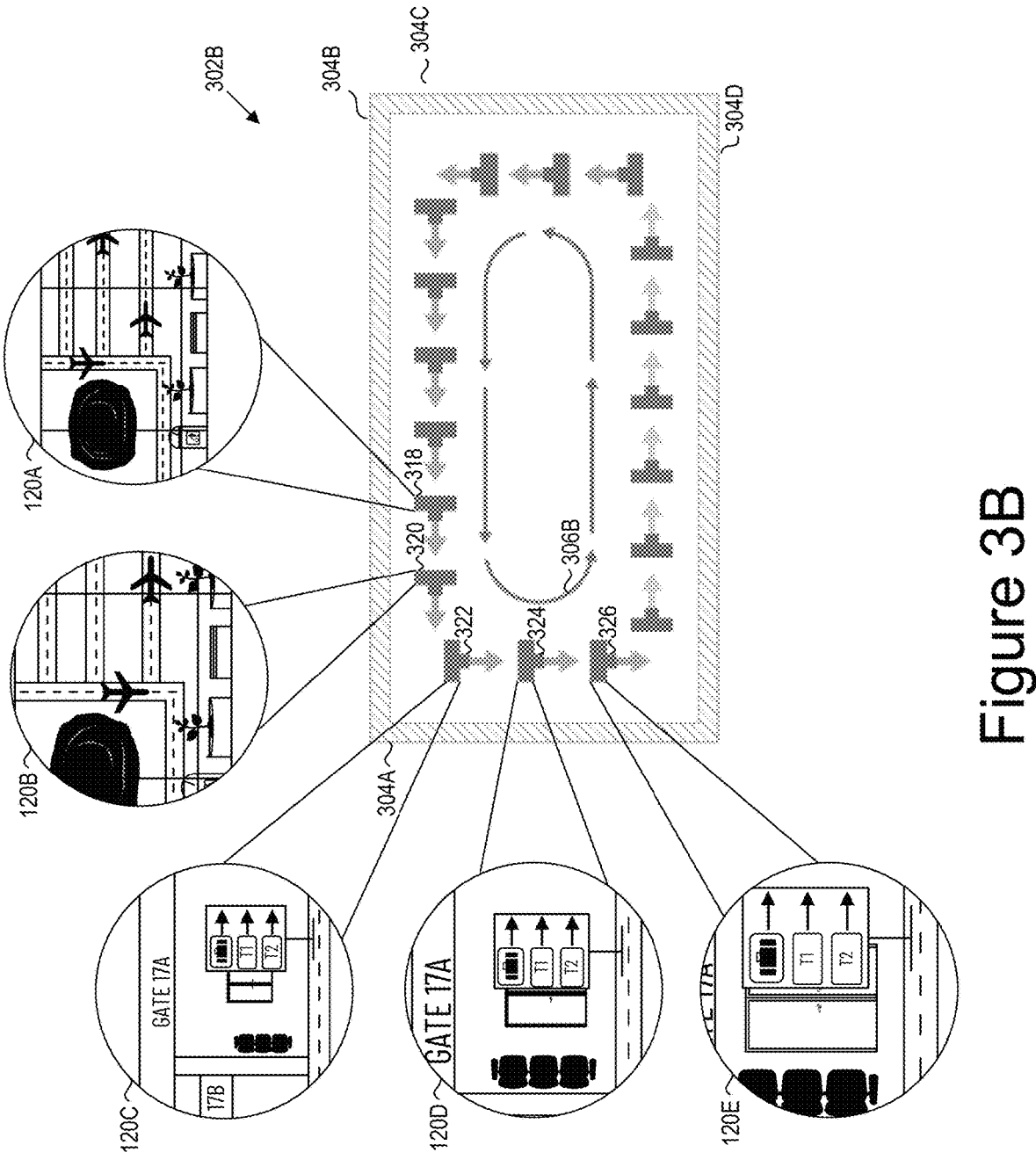
FIG. 3B depicts example capture instructions for capturing backward-facing depiction images for a POI depiction image set according to some implementations of the present disclosure.

Turning to FIG. 3B, FIG. 3B depicts example capture instructions for capturing backward-facing depiction images for a POI depiction image set according to some implementations of the present disclosure. FIG. 3B will be discussed in conjunction with FIG. 1. To follow the illustrated example, backward-facing capture instructions 302B illustrate the example POI 303 formed by the surfaces 304A-304D. The backward-facing capture instructions 302B further illustrate a movement indicator 306B. The movement indicator 306B indicates a backward direction that the user is to move, or traverse, while capturing the backward-facing depiction images 120. As illustrated, the backward-facing capture instructions 302B indicate to the user to traverse in a counter-clockwise direction around the periphery of the POI while capturing images from a viewpoint that faces the backward direction. In other words, the backward-facing capture instructions 302B instruct the user to begin moving counter-clockwise around the outer edge of the POI 303 while capturing images in the same direction as the user is moving.

The backward-facing capture instructions 302B depict a number of user capture representations 318-326. The user capture representations 318-326 correspond to specific positions, or locations, within the POI 303 at which the backward-facing depiction images 120 are captured. After capturing one of the backward-facing depiction images 120, the user can move from the location of one user capture representation to the location of a successive user capture representation. The direction of this movement is indicated by the movement indicator 306B. Here, the movement indicator 306B indicates movement in a direction opposite that of the movement indicator 306A of FIG. 3A.

Each of the user capture representations 318-326 includes an arrow that indicates a direction the user is facing when a corresponding backward-facing depiction image 120 is captured. A subset of the backward-facing depiction images 120 are depicted in FIG. 3B to illustrate differences between the backward-facing depiction image 120 as the user moves in a backward direction. However, it should be noted that backward-facing depiction image 120 can depict any type or manner of POI from any viewpoint or perspective.

For example, the backward-facing capture instructions 302B depict a user capture representation 318. The user capture representation 318 indicates a position at which the backward-facing depiction image 120A is captured. The user capture representation 318 also indicates the direction the user is facing when the backward-facing depiction image 120A is captured. To follow the previous example of an airport, the surface 304A of the POI 303 can be a floor-to-ceiling glass window that provides a view of the airport runways. When located at the position of the user capture representation 318, the user can capture the backward-facing depiction image 120A while facing the surface 304B.

The backward-facing capture instructions 302B depict a user capture representation 320. The user capture representation 320 indicates a position and direction the user is facing when the backward-facing depiction image 120B is captured. Because the user is still facing and moving in the same direction as when the backward-facing depiction image 120A was captured, the backward-facing depiction image 120B can depict the same portion of the surface 304A as the backward-facing depiction image 120A. However, because the user has moved closer to the surface 304A since the backward-facing depiction image 120A was captured, the viewpoint from which the backward-facing depiction image 120B depicts the surface 304A has also moved closer to the surface 304A.

The backward-facing capture instructions 302B depict a user capture representation 322. Like the user capture representations 318 and 320, the user capture representation 322 can indicate a position of the user, a direction the user is facing, and a direction the user is moving. Further, like the user capture representations 318 and 320, the user capture representation 322 faces the same direction as indicated by the movement indicator 306B for the position of the user capture representation 322. However, unlike the user capture representations 318 and 320, the user capture representation 322 faces the surface 304D of the POI 303 rather than the surface 304A. For example, as the user has moved closer to the glass window, the airplanes and objects depicted in the image appear to be larger, while other objects, such as the trash can, are no longer in frame.

The backward-facing capture instructions 302B depict a user capture representations 324 and 326. The user capture representations 324 and 326 indicate a position and a direction the user is facing when the backward-facing depiction images 120D and 120E are captured, respectively. Because the user is still facing and moving in the same direction as when the backward-facing depiction image 120C was captured, the backward-facing depiction images 120D and 120E can depict the same portion of the surface 304D as the backward-facing depiction image 120C. However, because the user has moved closer to the surface 304D since the backward-facing depiction image 120C was captured, the viewpoint from which the backward-facing depiction images 120D and 120E depicts the surface 304D has also moved closer to the surface 304C.

In such fashion, the backward-facing capture instructions 302B can instruct a user to capture each of the surfaces 304A-304D from a variety of locations and viewpoints while traversing the POI 303 in the direction indicated by the movement indicator 306B, thus ensuring that the backward-facing depiction images 120 are sufficient to train a model for generate a three-dimensional representation of the POI.

Figure 3C:
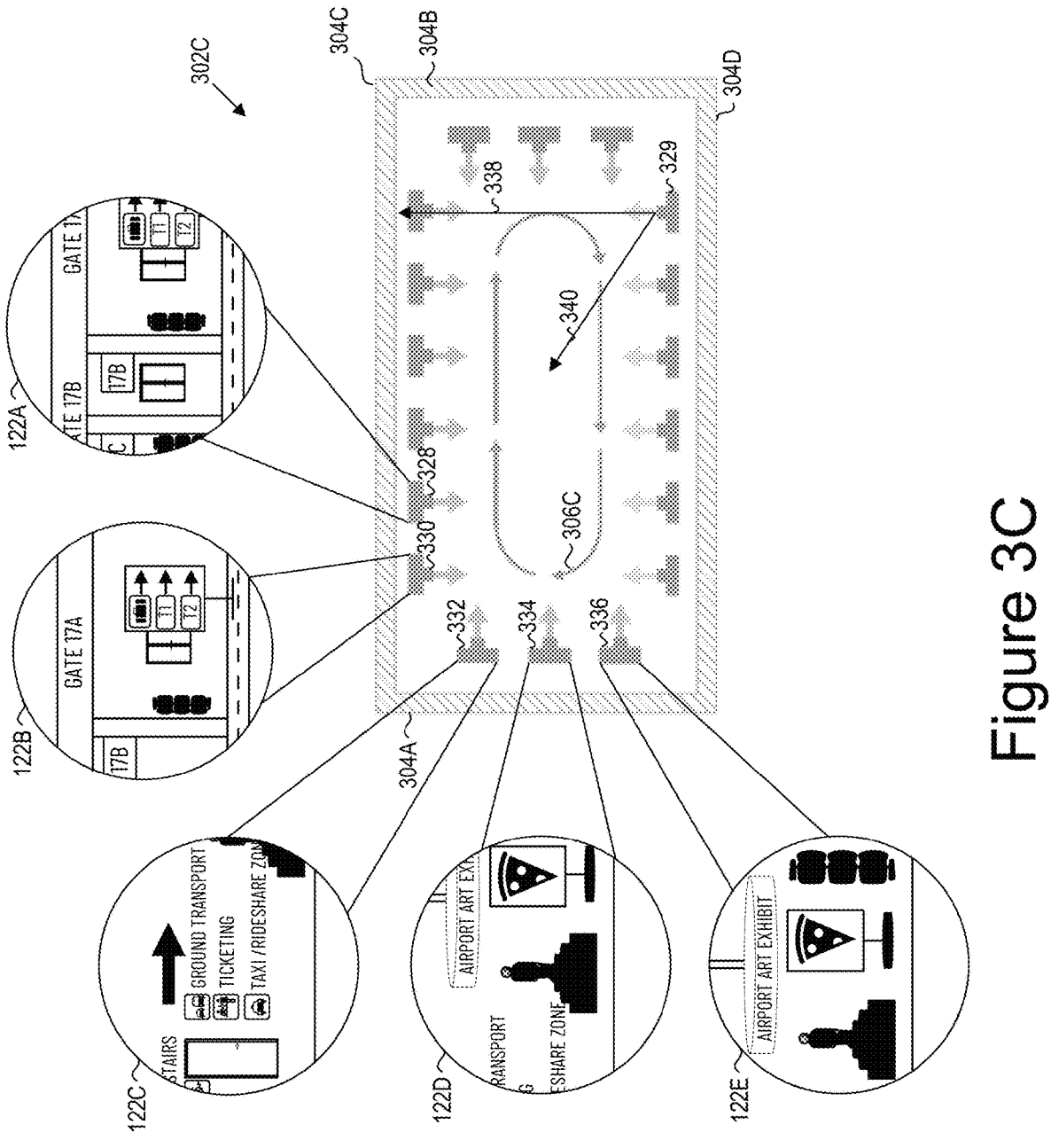
FIG. 3C depicts example capture instructions for capturing inward-facing depiction images for a POI depiction image set according to some implementations of the present disclosure.

Turning to FIG. 3C, FIG. 3C depicts example capture instructions for capturing inward-facing depiction images for a POI depiction image set according to some implementations of the present disclosure. FIG. 3C will be discussed in conjunction with FIG. 1. To follow the illustrated example, inward-facing capture instructions 302C illustrate the example POI 303 formed by the surfaces 304A-304D. The inward-facing capture instructions 302C further illustrate the movement indicator 306C. The movement indicator 306C indicates a direction that the user is to move, or traverse, while capturing the inward-facing depiction images 122. As illustrated, the backward-facing capture instructions 302B indicate to the user to traverse in a clockwise direction (i.e., a "forward" direction) around the periphery of the POI.

However, it should be noted that the depiction of the movement indicator 306C as indicating forward movement is only arbitrary. Rather, the movement indicator 306C can indicate any type or manner of movement pattern (e.g., a forward loop, a backward loop, mixed movement, etc.) sufficient to traverse the periphery of the POI 303. As such, if entering the room from a doorway located in surface 304D (not depicted), the user capturing the inward-facing depiction images 122 may begin moving towards either the surface 304A or the surface 304B, and when moving within a threshold distance of either, changing direction towards surface 304C.

While traversing the periphery of the POI 303, the user can capture images from a viewpoint that faces perpendicular to the forward direction and the backward direction. In other words, the user can face inward, toward the center of the room, while capturing the inward-facing depiction images 122. The inward-facing capture instructions 302C may indicate, or describe, the direction the user is to face when capturing the inward-facing depiction images 122 in a variety of ways. For example, the inward-facing capture instructions 302C can indicate to the user that they should face opposite the wall they are closest to. For another example, the inward-facing capture instructions 302C can indicate that the user should hold their image capture device at chest height and shuffle sideways around the periphery of the room.

The inward-facing capture instructions 302C depict a number of user capture representations 328-336. The user capture representations 328-336 correspond to specific positions, or locations, within the POI 303 at which the inward-facing depiction images 122 are captured. After capturing one of the inward-facing depiction images 122, the user can move from the location of one user capture representation to the location of a successive user capture representation. The direction of this movement is indicated by the movement indicator 306C. Each of the user capture representations 328-336 includes an arrow that indicates a direction the user is facing when a corresponding inward-facing depiction image 122 is captured.

In some implementations, the inward-facing capture instructions 302C can indicate that the user should aim their image capture device towards a "center point" of the POI 303 (e.g., via a textual prompt presented to the user, etc.).

Alternatively, in some implementations, the inward-facing capture instructions 302C can indicate that the user should not focus on a "center" of the POI 303, but rather should allow the viewpoint of the inward-facing depiction images 122 to move "sideways" as the user also moves "sideways." For example, the inward-facing capture instructions 302C depict a user capture representation 329, and two possible vectors 338 and 340 along which the viewpoint of the captured image can be aligned. If instructed to collect images while aligning the viewpoint of the image capture device parallel to the surface the user is facing (i.e., moving "sideways"), the viewpoint of the captured image can be aligned with the vector 338. Conversely, if instructed to collect images with viewpoints focused towards the "center" of the POI 303, the viewpoint of the captured image can be aligned with the vector 340.

The backward-facing capture instructions 302B depict the user capture representation 328. The user capture representation 328 indicates a position at which the inward-facing depiction image 122A is captured. The user capture representation 328 also indicates the direction the user is facing when the inward-facing depiction image 122A is captured. To follow the previous example of an airport, the inward-facing depiction image 122A can depict the same surface 304D of the POI 303 as depicted by the backward-facing depiction images 120C-120E of FIG. 3B. Specifically, as depicted, because the user capture representation 328 is located closer to the surface 304C than the user capture representations 322-326, the portion of the surface 304D depicted by the inward-facing depiction image 122A can be a different portion than that depicted by the backward-facing depiction images 120C-120E. Similarly, the inward-facing depiction image 122B can include more of the portion of the surface 304D depicted by the backward-facing depiction image 120C, as there is less distance between the user capture representations 322 and 330 than between user capture representations 322 and 328.

The inward-facing capture instructions 302C depict a user capture representation 332. The user capture representation 332 indicates a position and direction the user is facing when the inward-facing depiction image 122C is captured. Here, to maintain an inward-facing viewpoint, the user has aligned the viewpoint of the image perpendicular to the forward direction. Specifically, although moving toward the surface 304D, the viewpoint of the inward-facing depiction image 133C depicts the surface 304B from the inward-facing direction, which is perpendicular to the user's direction of movement towards the surface 304D.

The user can continue to move towards the surface 304D while capturing inward-facing depiction images 122D and 122E at the locations of user capture representations 334 and 336, respectively. Similar to the inward-facing depiction image 122C, the inward-facing depiction images 122D and 122E can depict the surface 304B from the viewpoint that faces perpendicular to the forward direction and backward direction (i.e., the "inward" direction). As such, the portion of the surface 304B depicted by the inward-facing depiction images 122C-122E can "move" along the surface 304B as the user moves towards the surface 304D. In other words, the "movement" of the viewpoint depicted in the inward-facing depiction images 122C-122E can correspond to the movement between the user capture representations 332-336.

In such fashion, the inward-facing capture instructions 302C can instruct a user to capture each of the surfaces 304A-304D from a variety of locations and viewpoints while traversing the POI 303 in the direction indicated by the movement indicator 306B, thus ensuring that the inward-facing depiction images 122 are sufficient to train a model for generate a three-dimensional representation of the POI.

Returning to FIG. 1, in some implementations, the instructions 108 in the capture information 104 can instruct the user of the user computing device 106 to capture a path image set 124. For the path image set 124, the instructions for capturing the path image set 124 can instruct the user to sequentially capture a series of path images 126A-126N while following a path the user wishes to depict. For example, if the user wishes to depict a straight path from a first point to a second point within the POI, the user can move along the path while sequentially capturing images (e.g., every three feet, etc.). For another example, the user may depict a looping path by navigating around the periphery of a room in a clockwise or counter-clockwise fashion. In this manner, the path image set can be utilized to derive the path for a virtual camera within the three-dimensional representation of the POI 303.

Figure 4:
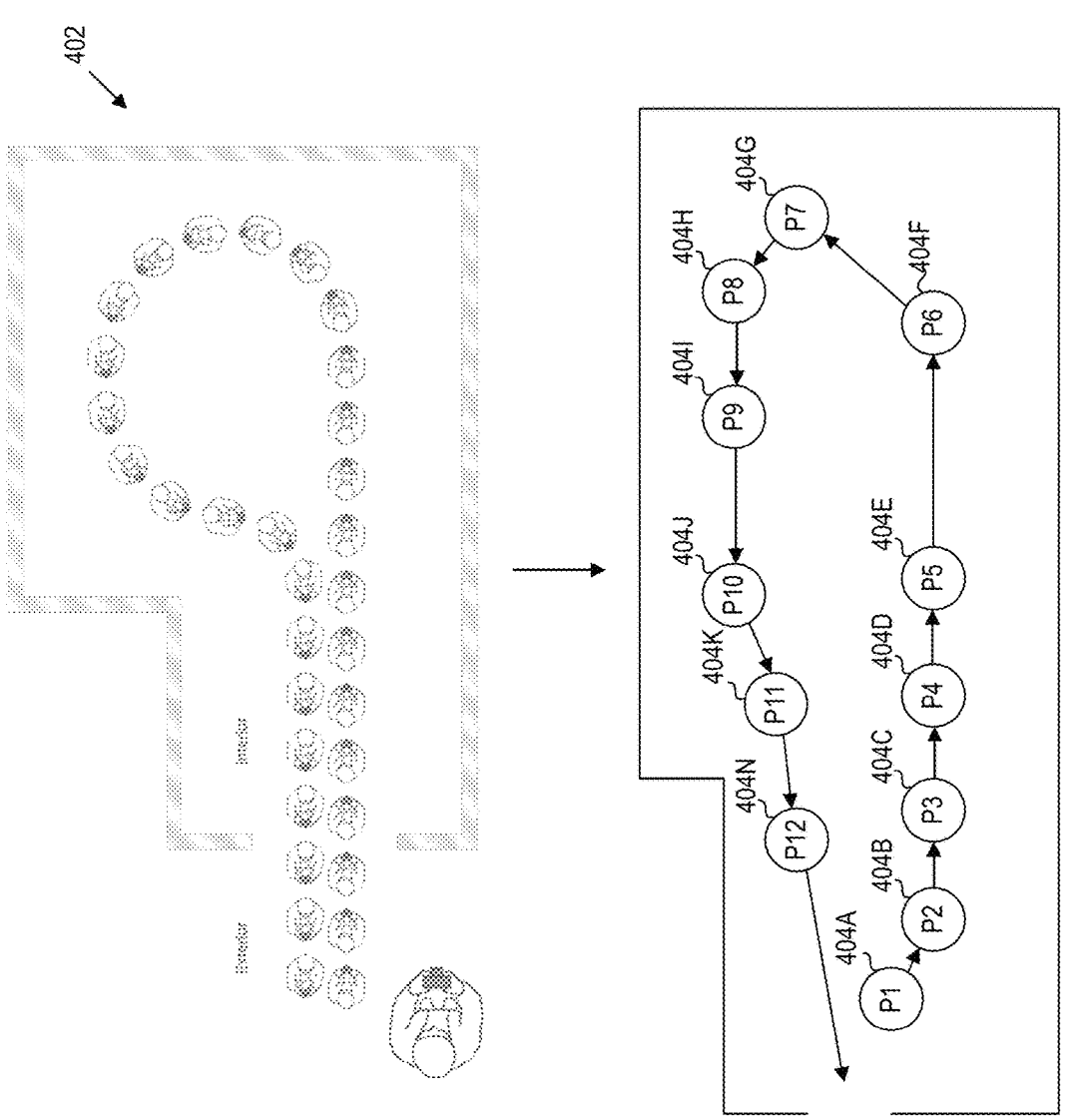
FIG. 4 depicts example capture instructions for capturing path images for a path image set according to some implementations of the present disclosure.

For a specific example, turning to FIG. 4, FIG. 4 depicts example capture instructions for capturing path images for a path image set according to some implementations of the present disclosure. FIG. 4 will be discussed in conjunction with FIG. 1. In particular, path image capture instructions 402 is an example instruction image that can be included in the instructions 108. To follow the depicted example, the path image capture instructions 402 indicates to the user of the user computing device 106 to capture path images at regular intervals while traversing a desired path. Based on the path image capture instructions 402, the user can capture the plurality of path images 126A-126N (generally, path images 126) at locations 404A-404N, respectively.

In some implementations, the path images can be captured at regular intervals, and/or distances. Alternatively, in some implementations, the path images 126 can be captured at non-regular intervals and/or distances. To follow the depicted example, the distance between locations 404E and 404F is greater than the distance between locations 404G and 404H. In this manner, by enabling reduced capture density for areas within the POI that are less relevant than other areas of the POI, implementations described herein can substantially reduce computational resource expenditure associated with representing those areas.

Returning to FIG. 1, the computing system 102 can receive representation information 128 from the user computing device 106. The representation information 128 can include the calibration image set 112, the POI depiction image set 116, and the path image set 124. In some implementations, the representation information 128 can include geo-location information 130. The geo-location information 130 can indicate a location of the POI for which the request 110 is provided. For example, if the POI is located in Times Square, New York City, the geo-location information 130 may indicate the exact coordinates of the POI, the geographic area of the POI, etc.

Additionally, or alternatively, in some implementations, the representation information 128 can include, or otherwise indicate, other characteristics of the POI. For example, if the POI is a business, the representation information 128 can indicate certain characteristics of the business (e.g., menu items for a restaurant, dimensional information for the building, products offered by the business, etc.). In some implementations, the representation information 128 can be utilized to supplement the POI depiction image set for generating the three-dimensional representation of the POI. For example, if the representation information 128 is indicative of the dimensions of the POI, the representation information 128 may be used in lieu of, or in addition to, the calibration image set 112.

In some implementations, the representation information 128 can include metadata 132. The metadata 132 can include application-specific information. For example, if the computing system 102 is associated with a mapping application, the metadata 132 can include mapping-specific information (e.g., information related to an entry for the POI within the mapping application, user-generated content submitted for the POI, etc.). For another example, if the computing system 102 is associated with a visual search application, the metadata can include search-specific information (e.g., search terms associated with the POI, etc.).

The computing system 102 can include a model trainer 134. The model trainer 134 can train a machine-learned POI representation model 136 based on the POI depiction image set 116. Specifically, the model trainer 134 can process the POI depiction image set 116 with the machine-learned POI representation model 136 to train the machine-learned POI representation model 136 to learn an implicit three-dimensional representation of the POI. Once trained, the machine-learned POI representation model 136 can receive a three-dimensional coordinate and viewing direction for a particular point in the POI as input and output a corresponding color and/or light information for the particular point.

The computing system 102 can include a renderer 138. The renderer 138 can include the machine-learned POI representation model 136 and a path point determinator 140. The path point determinator can process the path image set 124, the representation information 128, and/or information derived from the path image set 124 to obtain coordinate information 142. The coordinate information 142 can include three-dimensional coordinates and a viewing direction for a particular point within the POI. The machine-learned POI representation model 136 can process the coordinate information 142 to obtain radiance information (e.g., light, color, etc.) for the particular point. Iteratively, the renderer 138 can render each pixel of the rendered video data 144.

The rendered video data 144 can depict a three-dimensional representation of the POI depicted by the POI depiction image set 116. Specifically, the rendered video data 144 can depict the POI from the perspective of a virtual camera traversing a path through the POI indicated by the path image set 124. For example, if the POI is a hotel lobby, and the path image set 124 collectively depicts a path from the entrance of the hotel lobby to the reception desk, the rendered video data 144 can depict a virtual camera traversing from the entrance of the hotel to the reception desk. The computing system 102 can provide the rendered video data 144 to the user computing device 106.

Figure 5:
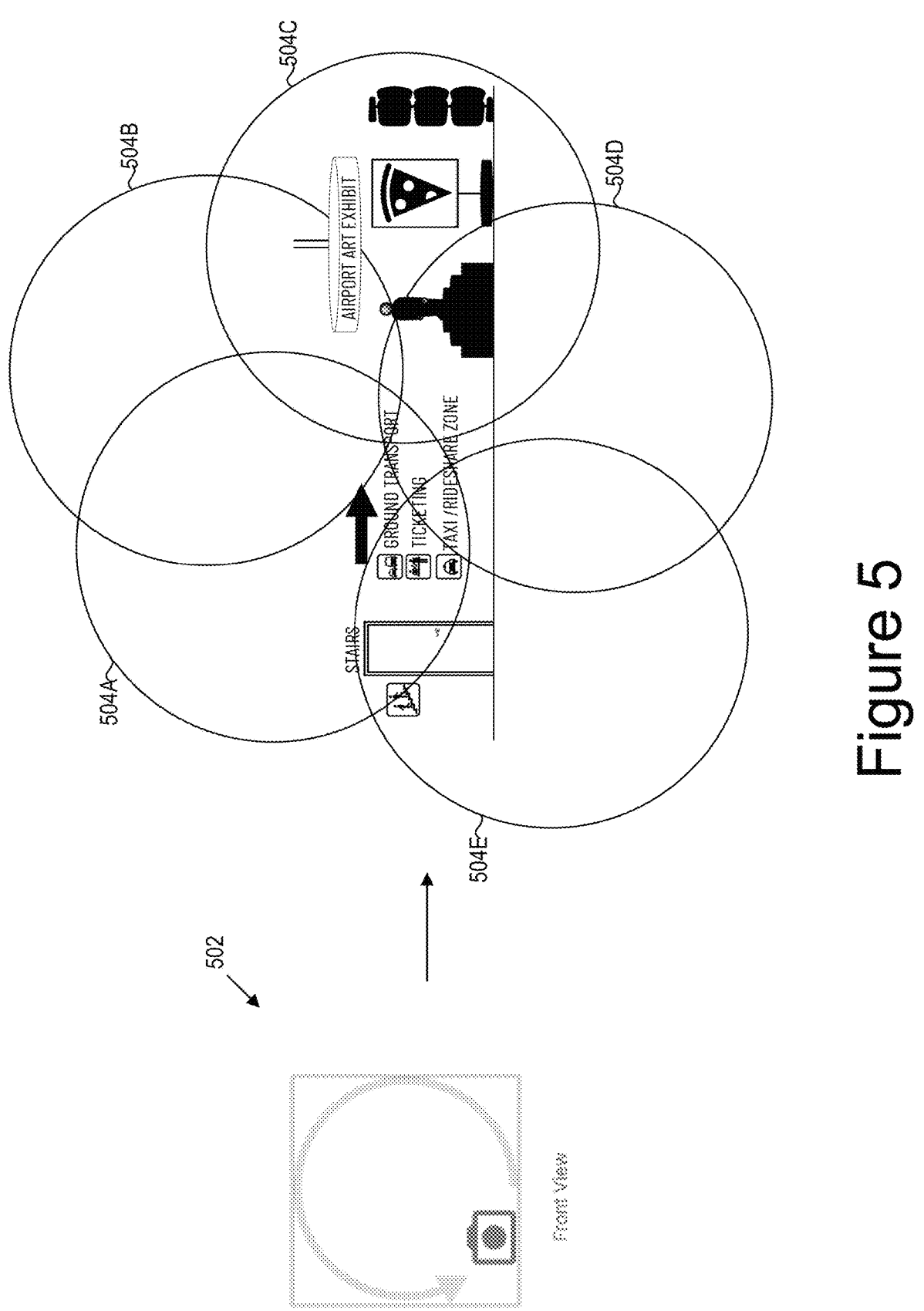
FIG. 5 depicts example capture instructions for performing an image capture pattern while capturing images for various image sets according to some implementations of the present disclosure.

FIG. 5 depicts example capture instructions for performing an image capture pattern while capturing images for various image sets according to some implementations of the present disclosure. FIG. 4 will be discussed in conjunction with FIG. 1. In particular, helical capture instructions 502 indicate a capture pattern for a user to perform while capturing images 504A-504E. To follow the depicted example, the helical capture instructions 502 instruct a user to move an image capture device in a helical (e.g., circular, etc.) capture pattern while capturing images for the image sets described previously. In response, the user can capture images 504A-504E while performing the helical capture pattern, and the images 504A-504E can depict different portions of a surface of a POI. In this manner, the helical capture instructions 502 can increase the likelihood that all portions of the surface of a POI are captured.

In some implementations, the image capture pattern illustrated by the capture instructions 502 can be some manner of pattern other than a helical capture pattern. For example, the capture pattern can be a grid-based capture pattern in which images are captured based on a grid. In some implementations, rather than moving an image capture device in a capture pattern, the image capture device can include a plurality of image capture sensors or devices that are arranged in a capture pattern. In this manner, the degree of capture movement performed by the user can be reduced, or eliminated.

FIG. 6 depicts a flow chart diagram of an example method 600 for optimizing image capture for training machine-learned POI representation models according to some implementations of the present disclosure. Although FIG. 6 depicts operations performed in a particular order for purposes of illustration and discussion, the methods of the present disclosure are not limited to the particularly illustrated order or arrangement. The various operations of the method 600 can be omitted, rearranged, combined, and/or adapted in various ways without deviating from the scope of the present disclosure.

At operation 602, a computing system can cause capture information to be sent to a user computing device. The capture information can include instructions to a user of the user computing device to capture a plurality of image sets for a POI. In some implementations, the instructions can be visual and/or textual instructions that instruct the user to capture a plurality of image sets, each image set including a different type of image. Additionally, or alternatively, in some implementations, the instructions can instruct the user how to capture each type of image. In some implementations, the instructions can include example images for the user. For example, the instructions may include capture instructions similar to, or the same as, capture instructions 202, 302A-302C, and 402 of FIGS. 2, 3A-3C, and 4 respectively.

At operation 604, the computing system can receive the plurality of image sets for the POI from the user computing device. The plurality of image sets can include a calibration image set. The calibration image set can include a plurality of calibration image pairs. Each of the calibration image pairs can include two calibration images captured at two different locations within the POI that are separated by a pre-defined distance. The plurality of image sets can include a POI depiction image set that includes a plurality of depiction images that depict the POI from a respective plurality of angles and/or positions. The plurality of image sets can include a path image set that includes a plurality of path images that collectively depict a path from a starting location to an ending location within the POI.

In some implementations, the POI can be a building that includes a plurality of areas. The computing system can receive the path image set including the plurality of path images that collectively depict the path from the starting location to the ending location within the POI. The starting location can include a first area of the plurality of areas, and the ending location can include a second area of the plurality of areas different than the first area. For example, the areas of the POI can be a room, a hallway, a floor of a building, a building, a vehicle interior, etc.

In some implementations, the computing system can receive a second path image set including a second plurality of path images that collectively depict a second path from a second starting location to a second ending location within the POI. The second starting location can include the second area of the plurality of areas, and the second ending location can include a third area of the plurality of areas.

In some implementations, the computing system can receive a forward-facing depiction image subset. The forward-facing depiction image subset can include a plurality of forward-facing depiction images captured by the user while traversing the POI in a forward direction. Each of the forward-facing depiction images can depict the POI from a viewpoint that faces the forward direction.

Additionally, or alternatively, in some implementations, the computing system can receive a backward-facing depiction image subset that includes a plurality of backward-facing depiction images captured by the user while traversing the POI in a backward direction opposite the forward direction. Each of the backward-facing depiction images can depict the POI from a viewpoint that faces the backward direction.

Additionally, or alternatively, in some implementations, the computing system can receive an inward-facing depiction image subset that includes a plurality of inward-facing depiction images captured by the user while traversing the POI. Each of the inward-facing depiction images can depict the POI from a viewpoint that faces perpendicular to the forward direction and the backward direction.

In some implementations, each of the one or more depiction image subsets is captured while moving an image capture device in a helical motion. More specifically, the capture instructions provided to the user can instruct the user to capture each image to be included in the image sets while moving an image capture device in a helical pattern. For example, assume the user is traversing the periphery of the POI in a forward direction to capture forward-facing depiction images for the POI depiction image set. While capturing the forward-facing depiction images, the user can move their image capture device in a circular motion. In this manner, more information can be obtained regarding the surfaces of the particular POI that the user is facing while capturing the forward-facing depiction images.

It should be noted that the capture instructions can instruct the user to perform some other type or manner of motion while capturing images. For example, the capture instructions may instruct the user to capture the images while moving the image capture device in a square or rectangular pattern, a star pattern, a triangular pattern, a randomized pattern, etc. Alternatively, in some implementations, the user can utilize a type or manner of image capture device(s) that obviates the performance of movement patterns while capturing the images.

In some implementations, each of the one or more depiction image subsets is captured while an auto-exposure feature of the image capture device is activated. More specifically, if capturing images with a specific type of image capture device, such as a DSLR, the capture instructions can instruct the user to set a value of an exposure parameter (e.g., International Organization for Standardization (ISO) sensitivity) to AUTO.

At operation 606, the computing system can train a machine-learned POI representation model with the plurality of image sets for the POI. The machine-learned POI representation model can be trained to generate a representation of the POI. For example, the computing system can first pose all POI depiction images in three-dimensional space based on the calibration images. The computing system can train the machine-learned POI representation model based on the posed POI depiction images.

In some implementations, prior to training the model, the computing system can process a plurality of images from the plurality of image sets for the POI to obtain a respective plurality of quality metrics. Based on the plurality of quality metrics, the computing system can identify one or more images of insufficient quality from the plurality of images. Responsive to identifying the one or more images of insufficient quality, the computing system can cause remedial capture information to be sent to the user computing device. The remedial capture information can include instructions to the user of the user computing device to re-capture one or more image sets that include the one or more images of insufficient quality.

At operation 608, the computing system can use the machine-learned POI representation model to generate video data that depicts a virtual camera traversing the path from the starting location to the ending location within the POI.

In some implementations, the computing system can use the machine-learned POI representation model to generate a plurality of sets of video data including a first set of video data that depicts the virtual camera traversing the path from the first area to the second area and a second set of video data that depicts the virtual camera traversing the second path from the second area to the third area.

In some implementations, to generate the video data, the computing system can process a plurality of inputs corresponding to a respective plurality of three-dimensional points within the POI with the machine-learned POI representation model to obtain color information. Each of the plurality of inputs can include a set of three-dimensional coordinates and viewing direction values for a corresponding three-dimensional point of the plurality of points. The color information can be indicative of a predicted color at each of the plurality of three-dimensional points from particular viewing direction. The computing system can render a frame of a plurality of frames of the video data based on the predicted color at each of the plurality of points within the POI.

In some implementations, the machine-learned POI representation model can be a NeRF model, and the computing system can process the plurality of three-dimensional coordinates corresponding to the respective plurality of points within the POI with the NeRF neural network to obtain the radiance information indicative of the predicted radiance at each of the plurality of points within the POI.

In some implementations, prior to processing the plurality of three-dimensional coordinates with the NeRF neural network, the computing system can perform a raycasting process to obtain the plurality of three-dimensional coordinates corresponding to the plurality of points within the POI. The raycasting process can originate from a viewpoint of the virtual camera. In some implementations, the viewpoint of the virtual camera can be based at least in part on the path image set.

FIG. 7 depicts a flow chart diagram of an example method 700 for local optimization of image capture for training machine-learned POI representation models according to some implementations of the present disclosure. Although FIG. 7 depicts operations performed in a particular order for purposes of illustration and discussion, the methods of the present disclosure are not limited to the particularly illustrated order or arrangement. The various operations of the method 700 can be omitted, rearranged, combined, and/or adapted in various ways without deviating from the scope of the present disclosure.

At operation 702, a user computing device (e.g., computing system, laptop, desktop, smartphone, image capture device, etc.) can obtain capture information from a computing system. The capture information can include instructions to a user of the user computing device to capture a plurality of image sets for a POI.

At operation 704, the user computing device can obtain the plurality of image sets for the POI. The plurality of image sets can be captured by the user via an image capture device. For example, the user computing device may include an in-built image capture device, and the user can utilize the in-built image capture device to capture the image sets. For another example, the user can utilize a specific image capture device to capture the images, such as a DSLR, and can transfer the image sets to the user computing device (e.g., via physical storage media, wireless transfer, etc.).

At operation 706, the user computing device can perform a quality verification process for at least some of the plurality of image sets. The quality verification process can be any type or manner of process or technique that analyzes a quality of the image, and/or the content depicted by the image. In some implementations, the quality verification process can include processing the images with a machine-learned model trained to detect imperfections within the image, such as blurriness, obstructions blocking image capture, pixelation, etc. Additionally, or alternatively, in some implementations, the quality verification process can include processing the images with a machine-learned model trained to detect sensitive content depicted within an image. For example, the machine-learned model can be trained to detect whether inappropriate content is depicted in the image. For another example, the machine-learned model can be trained to detect whether privacy-sensitive content is depicted in the images.

In some implementations, the user computing device can perform a corrective action based on the quality verification process. For example, if the quality verification process identifies an inappropriate or privacy-sensitive object depicted in the image, the quality user computing device may apply a mask effect to mask the object. Alternatively, the user computing device may transmit information to the computing system indicating the location of the object within the image.

In some implementations, the quality verification process can include receiving quality verification information from the computing system. More specifically, to perform the quality verification process, the user computing device can transmit the images to the computing system for evaluation. The computing system can evaluate the quality of the images based on the metrics described above, and can communicate the results of the process to the user computing device.

Additionally, or alternatively, in some implementations, based on the quality verification process, the user computing device can determine that capture of additional images is required. If required, the user computing device can indicate to the user that the user should recapture certain images within a particular image set, or re-capture the entire image set.

Specifically, in some implementations, the user computing device can process a plurality of images from the plurality of image sets for the POI to obtain a respective plurality of quality metrics. Based on the plurality of quality metrics, the user computing device can identify one or more images of insufficient quality from the plurality of images.

Responsive to identifying the one or more images of insufficient quality, the user computing device can cause display of instructions to the user of the user computing device to re-capture an image set of the plurality of image sets that includes the one or more images of insufficient quality. For example, the user computing device can display the instructions on a display device associated with the user computing device (e.g., a smartphone display, a Mixed Reality (MR) display device, etc.). The user computing device can obtain a replacement image set for the image set that includes the one or more images of insufficient quality.

For another example, the user computing device can receive, from the computing system, remedial capture information that includes instructions to display to the user of the user computing device. The instructions instruct the user to re-capture one or more image sets that include the one or more images of insufficient quality. Responsive to receiving the remedial capture information, the user computing device can cause display of instructions to the user of the user computing device to re-capture the image set that includes the one or more images of insufficient quality. The user computing device can obtain a replacement image set for the image set that includes the one or more images of insufficient quality.

At operation 708, the user computing device can, responsive to performing the quality verification process, transmit capture information to the computing system. The capture information can include the plurality of image sets for the POI.

At operation 710, the user computing device can obtain, from the computing system, video data that depicts a virtual camera traversing the path from the starting location to the ending location within the POI. The video data can be generated by the computing system using a machine-learned POI representation model that is trained to generate a representation of the POI based on the plurality of image sets.

Figure 8:
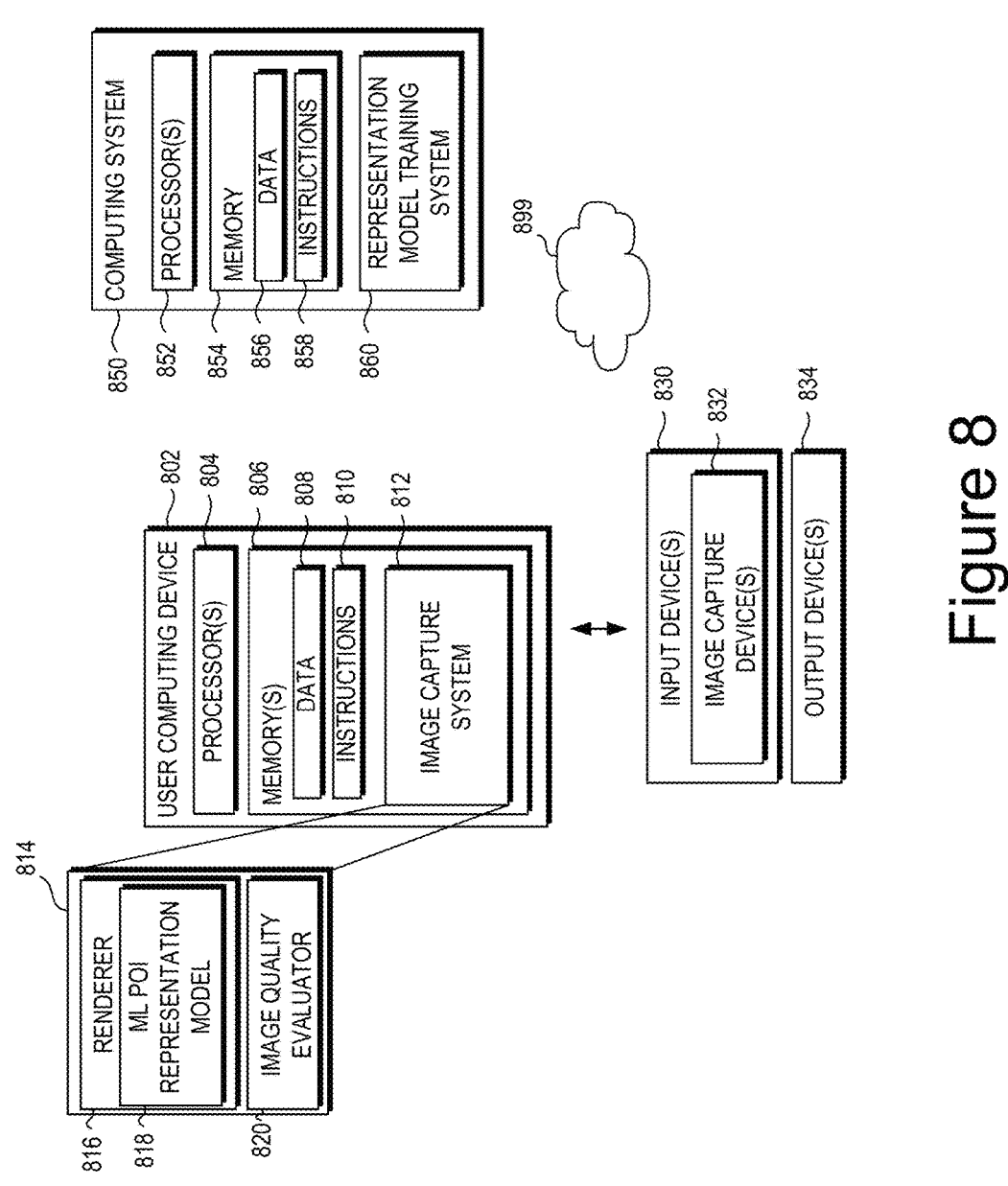
FIG. 8 depicts a block diagram of an example computing environment that performs optimization of image capture for training machine-learned POI representation models according to example implementations of the present disclosure.

FIG. 8 depicts a block diagram of an example computing environment 800 that performs optimization of image capture for training machine-learned POI representation models according to example implementations of the present disclosure. The computing environment 800 includes a user computing device 802 that is associated with a user of an application-based service, such as a mapping service and/or a visual search service.

The user computing device 802 can be any type of computing device, such as, for example, a personal computing device (e.g., laptop or desktop), a mobile computing device (e.g., smartphone or tablet), a gaming console or controller, a wearable computing device (e.g., an virtual/ augmented reality device, etc.), an embedded computing device, a broadcasting computing device (e.g., a webcam, etc.), etc.

In particular, the user computing device 802 can, in some implementations, be a computing system for capturing images for training a machine-learned model. For example, the user computing device 802 can be a smartphone that includes an image capture device sufficient for capturing images for training of a machine-learned POI representation model. For another example, the user computing device can be a computing device (e.g., a laptop, smartphone, etc.) that can receive images captured using a specific image capture device (e.g., a DSLR, etc.).

The user computing device 802 includes processor(s) 804 and memory(s) 806. The processor(s) 804 can be any suitable processing device (e.g., a processor core, a microprocessor, an ASIC, an FPGA, a controller, a microcontroller, etc.) and can be one processor or processors that are operatively connected. The memory 806 can include non-transitory computer-readable storage media(s), such as RAM, ROM, EEPROM, EPROM, flash memory devices, magnetic disks, etc., and combinations thereof. The memory 806 can store data 808 and instructions 810 which are executed by the processor 804 to cause the user computing device 802 to perform operations.

In particular, the memory 806 of the user computing device 802 can include an image capture system 812. The image capture system 812 can facilitate image capture for training and utilization of a machine-learned POI representation model. To facilitate image capture, the image capture system 812 can include service module(s) 814 which, by providing various services, can collectively facilitate image capture and transmission.

For example, the service module(s) 814 can include a renderer 816. The renderer 816 can include a machine-learned POI representation model 818. The renderer 816 can utilize the machine-learned POI representation model 818 to generate video data as described with regards to the renderer 138 of FIG. 1.

The machine-learned POI representation model 818 can be, or otherwise include, various machine-learned model(s) such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

For another example, the service module(s) 814 can include an image quality evaluator 820. The image quality evaluator 820 can evaluate the quality of an image for training of the machine-learned POI representation model 818, and can instruct the user to re-capture images if images of insufficient quality are detected.

The user computing device 802 can also include input device(s) 830 that receive inputs from a user, or otherwise capture data associated with a user. For example, the input device(s) 830 can include a touch-sensitive device (e.g., a touch-sensitive display screen or a touch pad) that is sensitive to the touch of a user input object (e.g., a finger or a stylus). The touch-sensitive device can serve to implement a virtual keyboard. Other example user input components include a microphone, a traditional keyboard, or other means by which a user can provide user input.

In some implementations, the user computing device 802 can include, or can be communicatively coupled to, input device(s) 830. For example, the input device(s) 830 can include a camera device that can capture two-dimensional image data of a POI. In some implementations, the input device(s) 830 can include a number of camera devices communicatively coupled to the user computing device 802 that are configured to capture image data from different perspectives for generation of three-dimensional pose data/ representations (e.g., a representation of a POI, etc.).

In some implementations, the input device(s) 830 can include sensor devices configured to capture sensor data indicative of movements of a user associated with the computing user computing device 802 (e.g., accelerometer(s), Global Positioning Satellite (GPS)

sensor(s), gyroscope(s), infrared sensor(s), head tracking sensor(s) such as magnetic capture system(s), an omni-directional treadmill device, sensor(s) configured to track eye movements of the user, etc.).

In particular, the input device(s) 830 can include specific image capture devices 832. The specific image capture devices 832 can be, or otherwise include, devices purpose-built for capturing image data or video data. For example, the input device(s) 832 can include DSLR camera(s), omni-directional image capture device(s), high-resolution video capture device(s), wearable image capture device(s), etc.

In some implementations, the user computing device 802 can include, or be communicatively coupled to, output device(s) 834. Output device(s) 834 can be, or otherwise include, device(s) configured to output audio data, image data, video data, etc. For example, the output device(s) 834 can include a two-dimensional display device (e.g., a television, projector, smartphone display device, etc.). For another example, the output device(s) 834 can include display devices for an augmented reality device or virtual reality device.

The computing system 850 includes processor(s) 852 and a memory 854. The processor(s) 852 can be any suitable processing device (e.g., a processor core, a microprocessor, an ASIC, an FPGA, a controller, a microcontroller, etc.) and can be one processor or processors that are operatively connected. The memory 854 can include non-transitory computer-readable storage media(s), such as RAM, ROM, EEPROM, EPROM, flash memory devices, magnetic disks, etc., and combinations thereof. The memory 854 can store data 856 and instructions 858 which are executed by the processor 852 to cause the computing system 850 to perform operations.

In some implementations, the computing system 850 can be, or otherwise include, a virtual machine or containerized unit of software instructions executed within a virtualized cloud computing environment (e.g., a distributed, networked collection of processing devices), and can be instantiated on request. Additionally, or alternatively, in some implementations, the computing system 850 can be, or otherwise include, physical processing devices, such as processing nodes within a cloud computing network (e.g., nodes of physical hardware resources).

The computing system 850 can facilitate the training of the machine-learned POI representation model 818. More specifically, the computing system 850 can utilize a representation model training system 860 to train the machine-learned POI representation model 818 and/or perform any necessary processing of training data (e.g., images). For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. In some implementations, performing backwards propagation of errors can include performing truncated backpropagation through time. The representation model training system 860 can perform a number of generalization techniques (e.g., weight decays, dropouts, etc.) to improve the generalization capability of the models being trained.

The representation model training system 860 includes computer logic utilized to provide desired functionality. The representation model training system 860 can be implemented in hardware, firmware, and/or software controlling a general purpose processor. For example, in some implementations, the representation model training system 860 includes program files stored on a storage device, loaded into a memory and executed by one or more processors. In other implementations, the representation model training system 860 includes one or more sets of computer-executable instructions that are stored in a tangible computer-readable storage medium such as RAM, hard disk, or optical or magnetic media.

In some implementations, the computing system 850 includes, or is otherwise implemented by, server computing device(s). In instances in which the computing system 850 includes multiple server computing devices, such server computing devices can operate according to sequential computing architectures, parallel computing architectures, or some combination thereof.

In some implementations, the computing system 850 can receive data from the user computing device(s) 802 according to various encryption scheme(s) (e.g., codec(s), lossy compression scheme(s), lossless compression scheme(s), etc.). For example, the user computing device 802 can encode audio data with an audio codec, and then transmit the encoded audio data to the computing system 850. The computing system 850 can decode the encoded audio data with the audio codec. In some implementations, the user computing device 802 can dynamically select between a number of different codecs with varying degrees of loss based on conditions (e.g., available network bandwidth, accessibility of hardware/software resources, etc.) of the network 899, the user computing device 802, and/or the computing system 850. For example, the user computing device 802 can dynamically switch from audio data transmission according to a lossy encoding scheme to audio data transmission according to a lossless encoding scheme based on a signal strength between the user computing device 802 and the network 899.

The network 899 can be any type of communications network, such as a local area network (e.g., intranet), wide area network (e.g., Internet), or some combination thereof and can include any number of wired or wireless links. In general, communication over the network 899 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification. As such, it should be noted that any previous reference in the specification to the following terms should be understood in light of these definitions.

Cloud: as used herein, the term "cloud" or "cloud computing environment" generally refers to a network of inter-connected computing devices (e.g., physical computing devices, virtualized computing devices, etc.) and associated storage media which interoperate to perform computational operations such as data storage, transfer, and/or processing. In some implementations, a cloud computing environment can be implemented and managed by an information technology (IT) service provider. The IT service provider can provide access to the cloud computing environment as a service to various users, who can in some circumstances be referred to as "cloud customers."

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
   causing, by a computing system comprising one or more computing devices, capture information to be sent to a user computing device, wherein the capture information comprises instructions to a user of the user computing device to capture a plurality of image sets for a Point of Interest (POI), and wherein the instructions indicate that a distance, between the user computing device and surfaces of the POI, from which to capture the plurality of image sets is greater than a threshold distance;
   receiving, by the computing system from the user computing device, the plurality of image sets for the POI, wherein the plurality of image sets comprises:
   a calibration image set comprising a plurality of calibration image pairs, each of the calibration image pairs comprising two calibration images captured at two different locations within the POI that are separated by a pre-defined distance;
   a POI depiction image set comprising a plurality of depiction images that depict the POI from a respective plurality of angles and/or positions; and
   a path image set comprising a plurality of path images that collectively depict a path from a starting location to an ending location within the POI;
   training, by the computing system, a machine-learned POI representation model with the plurality of image sets for the POI, wherein the machine-learned POI representation model is trained to generate a representation of the POI; and using, by the computing system, the machine-learned POI representation model to generate video data that depicts a virtual camera traversing the path from the starting location to the ending location within the POI.

2. The computer-implemented method of claim 1, wherein:
   the POI comprises a building comprising a plurality of areas; and
   receiving the plurality of image sets for the POI comprises:
      receiving, by the computing system from the user computing device, the path image set comprising the plurality of path images that collectively depict the path from the starting location to the ending location within the POI, wherein the starting location comprises a first area of the plurality of areas, and wherein the ending location comprises a second area of the plurality of areas different than the first area.

3. The computer-implemented method of claim 2, wherein the plurality of areas comprises at least one of:
   a room;
   a hallway;
   a floor of a building;
   a building; or
   a vehicle interior.

4. The computer-implemented method of claim 2, wherein receiving the plurality of image sets for the POI further comprises:
   receiving, by the computing system from the user computing device, a second path image set comprising a second plurality of path images that collectively depict a second path from a second starting location to a second ending location within the POI, wherein the second starting location comprises the second area of the plurality of areas, and wherein the second ending location comprises a third area of the plurality of areas; and
   wherein using the machine-learned POI representation model to generate the video data comprises:
      using, by the computing system, the machine-learned POI representation model to generate a plurality of sets of video data comprising a first set of video data that depicts the virtual camera traversing the path from the first area to the second area and a second set of video data that depicts the virtual camera traversing the second path from the second area to the third area.

5. The computer-implemented method of claim 1, wherein using the machine-learned POI representation model to generate the video data comprises:
   processing, by the computing system, a plurality of inputs corresponding to a respective plurality of three-dimensional points within the POI with the machine-learned POI representation model to obtain color information, wherein each of the plurality of inputs comprises a set of three-dimensional coordinates and viewing direction values for a corresponding three-dimensional point of the plurality of points, and wherein the color information is indicative of a predicted color at each of the plurality of three-dimensional points from particular viewing direction; and
   rendering, by the computing system, a frame of a plurality of frames of the video data based on the predicted color at each of the plurality of points within the POI.

6. The computer-implemented method of claim 5, wherein the machine-learned POI representation model comprises a Neural Radiance Field (NeRF) neural network, and wherein processing the plurality of three-dimensional coordinates comprises:

processing, by the computing system, the plurality of three-dimensional coordinates corresponding to the respective plurality of points within the POI with the NeRF neural network to obtain radiance information indicative of a predicted radiance at each of the plurality of points within the POI, and wherein the radiance information comprises the color information.

7. The computer-implemented method of claim 6, wherein, prior to processing the plurality of three-dimensional coordinates with the NeRF neural network, the method comprises:

performing, by the computing system, a raycasting process to obtain the plurality of three-dimensional coordinates corresponding to the plurality of points within the POI, wherein the raycasting process originates from a viewpoint of the virtual camera.

8. The computer-implemented method of claim 7, wherein the viewpoint of the virtual camera is based at least in part on the path image set.

9. The computer-implemented method of claim 1, wherein receiving the plurality of image sets for the POI comprises:

receiving, by the computing system from the user computing device, the POI depiction image set, wherein the POI depiction image set comprises one or more depiction image subsets, comprising at least one of:

a forward-facing depiction image subset comprising a plurality of forward-facing depiction images captured by the user while traversing the POI in a forward direction, wherein each of the forward-facing depiction images depicts the POI from a viewpoint that faces the forward direction;

a backward-facing depiction image subset comprising a plurality of backward-facing depiction images captured by the user while traversing the POI in a backward direction opposite the forward direction, wherein each of the backward-facing depiction images depicts the POI from a viewpoint that faces the backward direction; or an inward-facing depiction image subset comprising a plurality of inward-facing depiction images captured by the user while traversing the POI, wherein each of the inward-facing depiction images depicts the POI from a viewpoint that faces perpendicular to the forward direction and the backward direction.

10. The computer-implemented method of claim 9, wherein each of the one or more depiction image subsets is captured while moving an image capture device in a helical motion.

11. The computer-implemented method of claim 10, wherein each of the one or more depiction image subsets is captured while an auto-exposure feature of the image capture device is activated.

12. The computer-implemented method of claim 1, wherein, prior to training the machine-learned POI representation model with the plurality of image sets for the POI, the method comprises:

processing, by the computing system, a plurality of images from the plurality of image sets for the POI to obtain a respective plurality of quality metrics;

based on the plurality of quality metrics, identifying, by the computing system, one or more images of insufficient quality from the plurality of images; and responsive to identifying the one or more images of insufficient quality, causing, by the computing system, remedial capture information to be sent to the user computing device, wherein the remedial capture information comprises instructions to the user of the user computing device to re-capture one or more image sets that include the one or more images of insufficient quality.

13. A user computing device, comprising:

one or more processor devices; and one or more tangible, non-transitory computer readable media storing computer-readable instructions that when executed by the one or more processor devices cause the one or more processor devices to perform operations, the operations comprising:

obtaining, from a computing system, capture information comprising instructions to a user of the user computing device to capture a plurality of image sets for a Point of Interest (POI), and wherein the instructions indicate that a distance, between the user computing device and surfaces of the POI, from which to capture the plurality of image sets is greater than a threshold distance;

responsive to obtaining the capture information, obtaining the plurality of image sets for the POI, wherein the plurality of image sets are captured by the user via an image capture device, and wherein the plurality of image sets comprises:

a calibration image set comprising a plurality of calibration image pairs, each of the calibration image pairs comprising two calibration images captured at two different locations within the POI that are separated by a pre-defined distance;

a POI depiction image set comprising a plurality of depiction images that depict the POI from a respective plurality of angles and/or positions; and a path image set comprising a plurality of path images that collectively depict a path from a starting location to an ending location within the POI;

performing a quality verification process for at least some of the plurality of image sets;

responsive to performing the quality verification process, transmitting capture information to the computing system, wherein the capture information comprises the plurality of image sets for the POI; and obtaining, from the computing system, video data that depicts a virtual camera traversing the path from the starting location to the ending location within the POI, wherein the video data is generated by the computing system using a machine-learned POI representation model that is trained to generate a representation of the POI based on the plurality of image sets.

14. The user computing device of claim 13, wherein:

the POI comprises a building comprising a plurality of areas; and obtaining the plurality of image sets for the POI comprises:

obtaining the path image set comprising the plurality of path images that collectively depict the path from the starting location to the ending location within the POI, wherein the starting location comprises a first area of the plurality of areas, and wherein the ending location comprises a second area of the plurality of areas different than the first area.

15. The user computing device of claim 14, wherein obtaining the plurality of image sets for the POI further comprises:

obtaining a second path image set comprising a second plurality of path images that collectively depict a second path from a second starting location to a second ending location within the POI, wherein the second starting location comprises the second area of the plurality of areas, and wherein the second ending location comprises a third area of the plurality of areas; and wherein obtaining the video data that depicts the virtual camera traversing the path from the starting location to the ending location comprises:

obtaining, from the computing system, a plurality of sets of video data comprising a first set of video data that depicts a virtual camera traversing the path from the first area to the second area and a second set of video data that depicts the virtual camera traversing the second path from the second area to the third area.

16. The user computing device of claim 13, wherein obtaining the plurality of image sets for the POI comprises:

obtaining the POI image depiction set comprising one or more depiction image subsets, comprising at least one of:

a forward-facing depiction image subset comprising a plurality of forward-facing depiction images captured by the user while traversing the POI in a forward direction, wherein each of the forward-facing depiction images depicts the POI from a viewpoint that faces the forward direction;

a backward-facing depiction image subset comprising a plurality of backward-facing depiction images captured by the user while traversing the POI in a backward direction opposite the forward direction, wherein each of the backward-facing depiction images depicts the POI from a viewpoint that faces the backward direction; or an inward-facing depiction image subset comprising a plurality of inward-facing depiction images captured by the user while traversing the POI, wherein each of the inward-facing depiction images depicts the POI from a viewpoint that faces perpendicular to the forward direction and the backward direction.

17. The user computing device of claim 16, wherein each of the one or more depiction image subsets is captured while moving an image capture device in a helical motion.

18. The user computing device of claim 13, wherein performing the quality verification process for the at least some of the plurality of image sets comprises:

processing a plurality of images from the plurality of image sets for the POI to obtain a respective plurality of quality metrics;

based on the plurality of quality metrics, identifying one or more images of insufficient quality from the plurality of images;

responsive to identifying the one or more images of insufficient quality, causing display of instructions to the user of the user computing device to re-capture an image set of the plurality of image sets that includes the one or more images of insufficient quality; and obtaining a replacement image set for the image set that includes the one or more images of insufficient quality.

19. The user computing device of claim 13, wherein performing the quality verification process for the at least some of the plurality of image sets comprises:

receiving, from the computing system, remedial capture information comprising instructions to display to the user of the user computing device, wherein the instructions instruct the user to re-capture one or more image sets that include the one or more images of insufficient quality;

responsive to receiving the remedial capture information, causing display of instructions to the user of the user computing device to re-capture the image set that includes the one or more images of insufficient quality; and obtaining a replacement image set for the image set that includes the one or more images of insufficient quality.

20. One or more tangible, non-transitory computer readable media storing computer-readable instructions that when executed by one or more processor devices cause the one or more processor devices to perform operations, the operations comprising:

causing capture information to be sent to a user computing device, wherein the capture information comprises instructions to a user of the user computing device to capture a plurality of image sets for a Point of Interest (POI), and wherein the instructions indicate that a distance, between the user computing device and surfaces of the POI, from which to capture the plurality of image sets is greater than a threshold distance;

receiving, from the user computing device, the plurality of image sets for the POI, wherein the plurality of image sets comprises:

a calibration image set comprising a plurality of calibration image pairs, each of the calibration image pairs comprising two calibration images captured at two different locations within the POI that are separated by a pre-defined distance;

a POI depiction image set comprising a plurality of depiction images that depict the POI from a respective plurality of angles and/or positions; and a path image set comprising a plurality of path images that collectively depict a path from a starting location to an ending location within the POI;

training a machine-learned POI representation model with the plurality of image sets for the POI, wherein the machine-learned POI representation model is trained to generate a representation of the POI; and using the machine-learned POI representation model to generate video data that depicts a virtual camera traversing the path from the starting location to the ending location within the POI.

\* \* \* \* \*